United States Patent
Kato et al.

(10) Patent No.: US 6,297,795 B1
(45) Date of Patent: Oct. 2, 2001

(54) SMALL INFORMATION PROCESSING APPARATUS

(75) Inventors: Naotaka Kato, Fujisawa; Itiro Siio, Yokohama; Hiroki Murata, Suginami-ku; Toru Aihara, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/016,713

(22) Filed: Jan. 30, 1998

(30) Foreign Application Priority Data

Feb. 24, 1997 (JP) .................................. 9-039018

(51) Int. Cl.⁷ ................................................. G09G 5/00
(52) U.S. Cl. ........................... 345/123; 345/121; 345/169
(58) Field of Search .................................. 345/123, 124, 345/125, 126, 169, 173, 184, 352, 161, 163, 167, 121

(56) References Cited

U.S. PATENT DOCUMENTS 5,563,631 * 10/1996 Masunaga ............................. 345/163
5,825,353 * 10/1998 Will ...................................... 345/125
5,835,732 * 11/1998 Kikinis ................................. 345/173

* cited by examiner

Primary Examiner—Matthew Luu
Assistant Examiner—Wesner Sajous
(74) Attorney, Agent, or Firm—J. Bruce Schelkopf

(57) ABSTRACT

An information processing apparatus having a relatively small display screen, and in particular to a small information processing apparatus of a type adapted to be held in the hand of a user and that can switch the mode for displaying data on a display screen between a portrait mode and a landscape mode. More specifically, the present invention retains to a small information processing apparatus that provides appropriate scroll functions for both display modes, i.e., the portrait mode and the landscape mode, using a hand manipulable input device.

8 Claims, 20 Drawing Sheets

FIG. 1
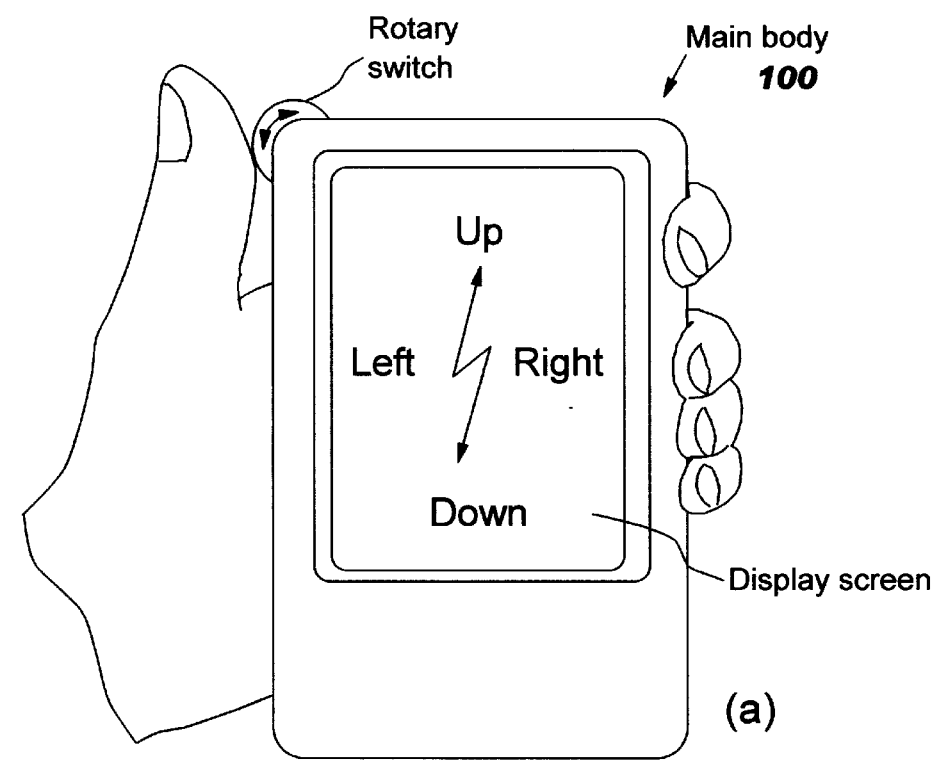
(a)
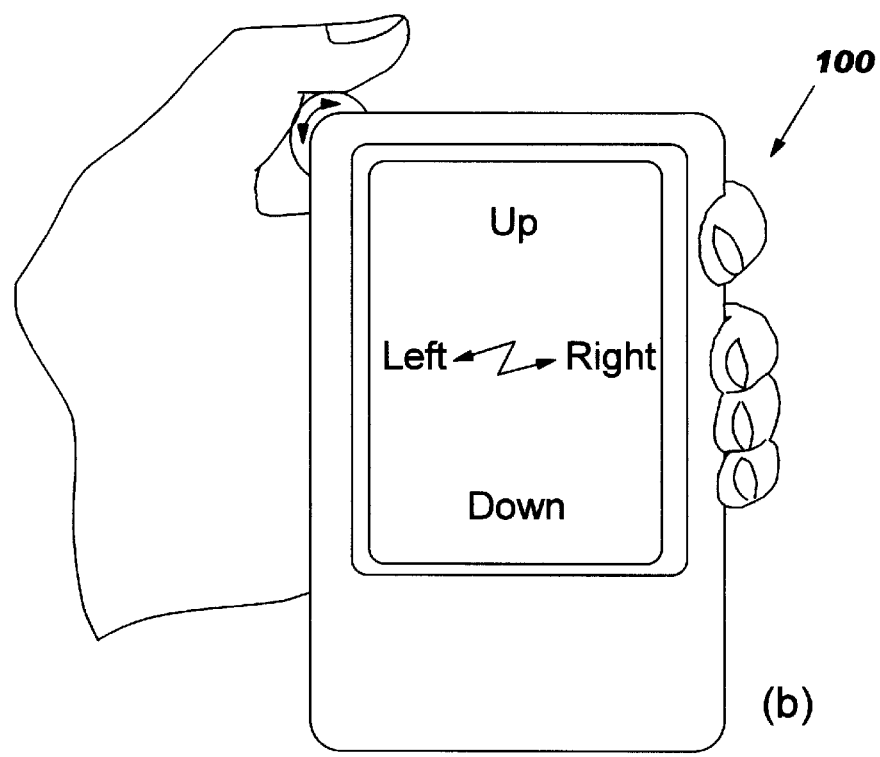
(b)

FIG. 2
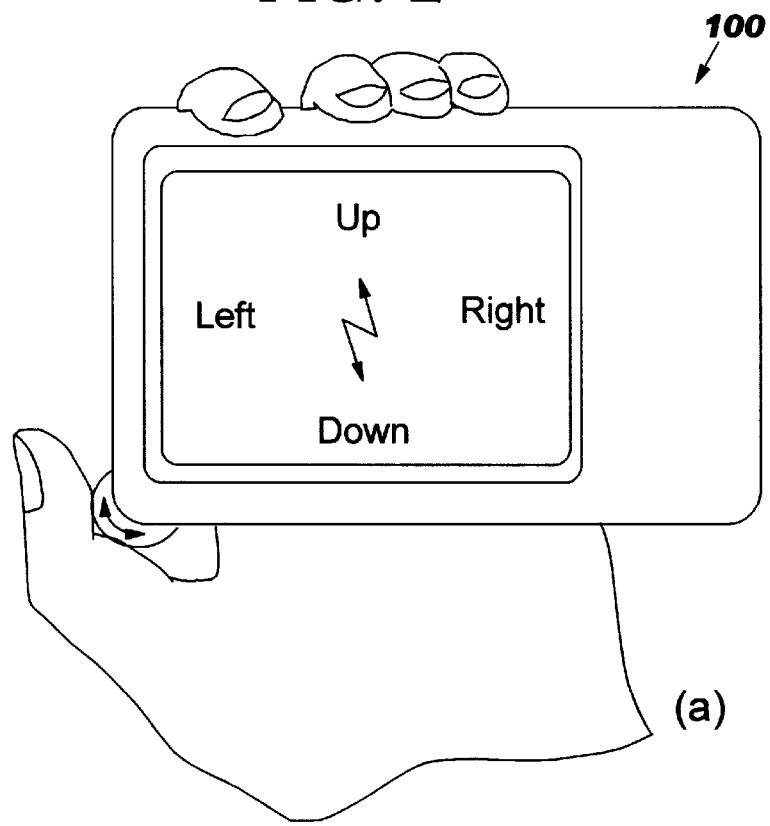
(a)
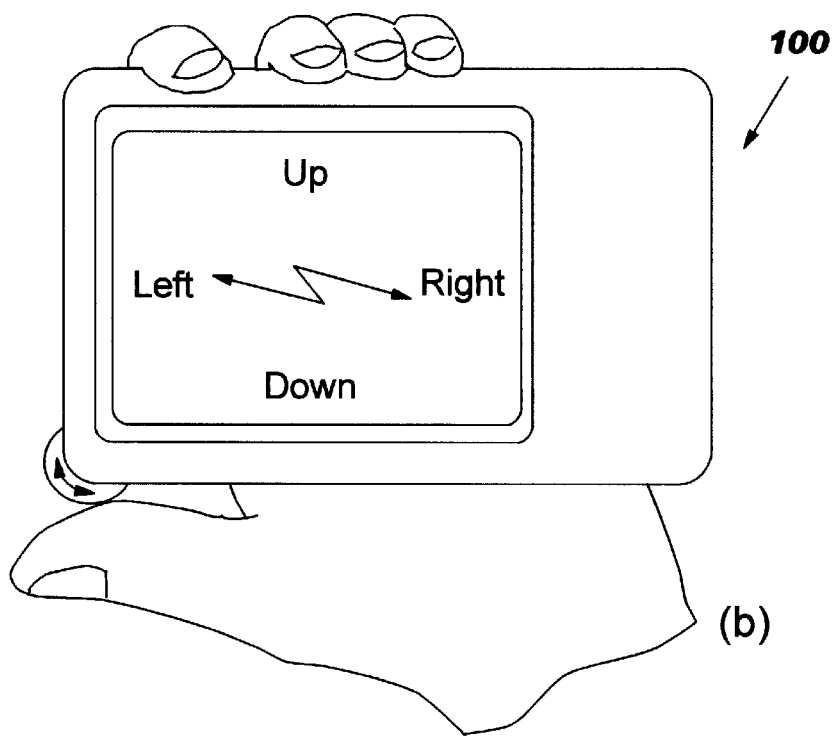
(b)

| | |
|---|---|
| 01 | Text/PIM Browser Ver. 1.0 |
| 02 | Asahi Flash News |
| 03 | National News |
| 04 | Business News |
| 05 | Sports News |
| 06 | Editorial |
| 07 | Column |
| 08 | Weather Report |
| 09 | |
| 10 | |
| 11 | |
| 12 | |
| 13 | |
| 14 | |
| 15 | |
| 16 | |
| 17 | |
| 18 | |
| 19 | |
| 20 | |

11

```
         1         2
123456789012345678901234
01 ┌─────────────────────┐
   │ Text/PIM Browser Ver. 1.0
02 │ Asahi Flash News
03 │ National News
04 │ Business News                    
05 │ Sports News
06 │ Editorial
07 │ Column
08 │ Weather Report
09 │
10 │
...
20 └─────────────────────┘
```

FIG. 15

```
              1         2
     123456789012345678901234
  01 abcdefghijklmnopqrstuvwx
  02 abcdefghijklmnopqrstuvwx
  03 abcdefghijklmnopqrstuvwx
  04 abcdefghijklmnopqrstuvwx
  05 abcdefghijklmnopqrstuvwx
  06 abcdefghijklmnopqrstuvwx
  07 abcdefghijklmnopqrstuvwx
  08 abcdefghijklmnopqrstuvwx
  09 abcdefghijklmnopqrstuvwx
  10 abcdefghijklmnopqrstuvwx
  11 abcdefghijklmnopqrstuvwx
  12 abcdefghijklmnopqrstuvwx
  13 abcdefghijklmnopqrstuvwx
  14 abcdefghijklmnopqrstuvwx
  15 abcdefghijklmnopqrstuvwx
  16 abcdefghijklmnopqrstuvwx
  17 abcdefghijklmnopqrstuvwx
  18 abcdefghijklmnopqrstuvwx
  19 abcdefghijklmnopqrstuvwx
  20 abcdefghijklmnopqrstuvwx
```

```
                    1         2
          123456789012345678901234
       ┌─────────────────────────┐
    01 │abcdefghijklmnopqrstuvwx│
    02 │abcdefghijklmnopqrstuvwx│
    03 │abcdefghijklmnopqrstuvwx│         11
    04 │abcdefghijklmnopqrstuvwx│    ←
    05 │abcdefghijklmnopqrstuvwx│
    06 │abcdefghijklmnopqrstuvwx│
    07 │abcdefghijklmnopqrstuvwx│
    08 │ab ┌─────────────────┐ vwx│
    09 │ab │ Portrait/Landscape │ vwx│
    10 │ab │ Wide/Narrow space │ vwx│
    11 │ab │ Wrap on/off       │ vwx│
    12 │ab │ Close             │ vwx│
    13 │abcdefghijklmnopqrstuvwx│
    14 │abcdefghijklmnopqrstuvwx│
    15 │abcdefghijklmnopqrstuvwx│
    16 │abcdefghijklmnopqrstuvwx│
    17 │abcdefghijklmnopqrstuvwx│
    18 │abcdefghijklmnopqrstuvwx│
    19 │abcdefghijklmnopqrstuvwx│
    20 │abcdefghijklmnopqrstuvwx│
       └─────────────────────────┘
```

FIG. 17

```
            1         2         3         4
   12345678901234567890123456789012345678 90
01 ┌abcdefgh i j k lmnopqrstuvwxyzABCDEFGHIJKLMN┐
02 │abcdefgh i j k lmnopqrstuvwxyzABCDEFGHIJKLMN│
03 │abcdefgh i j k lmnopqrstuvwxyzABCDEFGHIJKLMN│
04 │abcdefgh i j k lmnopqrstuvwxyzABCDEFGHIJKLMN│
05 │abcdefgh i j k lmnopqrstuvwxyzABCDEFGHIJKLMN│
06 │abcdefgh i j k lmnopqrstuvwxyzABCDEFGHIJKLMN│
07 │abcdefgh i j k lmnopqrstuvwxyzABCDEFGHIJKLMN│
08 │abcdefgh i j k lmnopqrstuvwxyzABCDEFGHIJKLMN│
09 │abcdefgh i j k lmnopqrstuvwxyzABCDEFGHIJKLMN│
10 └abcdefgh i j k lmnopqrstuvwxyzABCDEFGHIJKLMN┘
```

FIG. 18

```
            1         2         3         4
   12345678901234567890123456789012345678 90
01 ┌abcdefgh i j k lmnopqrstuvwxyzABCDEFGHIJKLMN┐
02 │abcdefgh i j k lmnopqrstuvwxyzABCDEFGHIJKLMN│
03 │abcdefgh i j ┌──────────────────┐CDEFGHIJKLMN│
04 │abcdefgh i j │ Portrait/Landscape│CDEFGHIJKLMN│
05 │abcdefgh i j │ Wide/Narrow space │CDEFGHIJKLMN│
06 │abcdefgh i j │ Wrap on/off       │CDEFGHIJKLMN│
07 │abcdefgh i j │ Close             │CDEFGHIJKLMN│
08 │abcdefgh i j k lmnopqrstuvwxyzABCDEFGHIJKLMN│
09 │abcdefgh i j k lmnopqrstuvwxyzABCDEFGHIJKLMN│
10 └abcdefgh i j k lmnopqrstuvwxyzABCDEFGHIJKLMN┘
```

SMALL INFORMATION PROCESSING APPARATUS

BACKGROUND OF THE INVENTION

The present invention relates to a small information processing apparatus having a relatively small display screen, and in particular to a small information processing apparatus of a type that can switch the mode for displaying data on the display screen to a portrait mode or to a landscape mode. More specifically, the present invention retains to a small information processing apparatus that provides appropriate scroll functions for both display modes, i.e., the portrait mode and the landscape mode.

In accordance with recent technical developments, various types of personal computers (PCS), such as desktop, tower and notebook types, have been developed and are being sold on the market. The notebook computers, designed while taking portability into consideration, are compact and light battery-operated computers. Lately, portable information terminals (also called "PDA (Personal Digital Assistants)"), which are smaller than notebook PCS, have appeared.

Portable information terminals, which are compact and thin enough to be held in user's palm, are designed to be employed not only on desk in a home, in a school or in an office, but also in mobile environments, such as on a train, bus or airplane, and outdoors, in such places as park. The sufficient storage of information to support user's daily works is demanded for this type of portable information terminal. Specific applications for a portable information terminal include (1) the support of unique ideas, by providing an idea processor; (2) the support of individual activities, by providing an electronic secretary function; and (3) the provision of appropriate information, by searing through a large quantity of data stored in memory. A definitive description of a portable information terminal has not yet been provided; even the form of user interface varies, and can be, for example, key input interfaces or tablet input interfaces. Also, the sizes of portable information terminals are not standardized; units may range in size from those that have approximate A5 size foot print to those that are the size of a business card.

For example, a PC card "IBM ChipCard VW-200" (hereinafter referred to simply as "VW-200"), sold by IBM Japan, Ltd., is a self-contained, functioning unit that employs an incorporated MPU. (The well known international standards for PC cards are determined primarily by PCMCIA (Personal Computer Memory card International Association) and JEIDA (Japan Electronic Industry Development Association)). That is, the VW-200 is driven by an incorporated coin battery and provides a calculation function and a data viewer function, and also acts as a portable information terminal.

VW-200 is a PC card of folding type that is constituted by a first housing portion having a Type form factor defined by PCMCIA/JEIDA, and a second housing portion rotatably connected to one end of the first housing portion. A PCMCIA connector is located at the other end of the first housing portion to provide a PCMCIA interface, and a liquid crystal display of 200×320 dots is recessed in the surface of the second housing portion. A lot of 20 characters×0.12 lines in the full-sized Japanese character mode can be displayed at one time on the liquid crystal display. Normally, the portrait mode is employed to display data on the display screen.

When VW-200 is inserted into an external computer system, for example, the computer system can download stored data via a PCMCIA interface to a memory incorporated in the VW-200. When the VW-200 is removed from the computer system, the VW-200 can display, without the involvement of the computer system, the downloaded data on the screen of the second housing portion. The data that are downloaded from the computer system may be PIM data, such as schedules and addresses, and text data from a Web page acquired in advance by the computer system.

The data that are expected to be viewed in the mobile environment by a small portable information terminal, such as VW-200, include Web pages and PIM data. These data are edited and accumulated in advance by an external computer system, and the resultant data are downloaded to a memory device in the VW-200. Web pages that are especially desired for reference purposes in mobile environments are the regular newspaper articles, and pages carrying data that require for prompt action, such as Stock Market, Weather, and Traffic Information. PIM data that are especially desirable for reference in a mobile environment are those for a Phone Book, an Address Book, the calendar and schedules.

There are a variety of display data types and their characteristics also vary. For example, data for the regular newspaper article are structured only as relatively long character strings, and whether or not an article is legible does not much depend on the direction in which it is displayed on the screen. However, stock market data are arranged as tables of company names and stock prices, and weather data are arranged as tables of local area names and corresponding climatic conditions. In other words, these data are text data into which line returns are inserted at intervals following relatively short character strings, and accordingly, for them the longitudinal side of a display is disposed perpendicularly. On the contrary, for the address data, the number of characters in a line must be increased so that relatively long local area names can be displayed. And for schedule data, especially if they are shown with hourly entries for an entire day, the number of characters in a line must also be increased. In other words, unlike for stock market data and weather data, for the display of data for addresses and schedules, the longitudinal side of a display is horizontally disposed.

If an information processing apparatus has a large display screen, it absorbs differences between the characteristics of various types of data displayed on its screen. However, a portable information terminal generally has only a relatively small display, and thus, whether data are readily apprehended by a user is greatly influenced by the manner in which the data are displayed, in portrait mode or in landscape mode. For example, the display screen of the VW-200 is only 20 characters×12 lines in full-sized Japanese character mode. If text data (e.g., schedule data), the longitudinal direction of which is horizontal, are displayed in portrait mode, frequently the data for one line will exceed the screen width, and accordingly, a user will be required to scroll the screen from side to side. On the other hand, if text data (e.g., market stock data), the longitudinal direction of which is vertical, are displayed in landscape mode, the number of data sets that can be displayed on one screen is reduced, and an area where no data is displayed is large. This is very inefficient.

Text is not easy to read if the ends of liens are cut off, and frequent scrolling a screen horizontally is an annoying task for a user. It is better for a user that text data, the longitudinal side of which is vertical, is displayed in portrait, and that the text data, the longitudinal side of which is horizontal, is rotated at 90° (or 270°) and displayed in landscape. Therefore, several information processing apparatuses that permit the data display direction to be changed from portrait to landscape, or vice versa, have been proposed. For example, in Japanese Unexamined Patent Publication No. Hei 8-129557 is disclosed a portable electronic reading apparatus that changes the display direction in accordance with whether the apparatus is settled in portrait or landscape posture. According to this invention, since an article can be efficiently displayed by a reader merely changing the direction in which the body of the apparatus is oriented, in the same manner as one would change the direction in which a magazine is oriented, the data is very easy to see and usability is superior.

When the screen display direction is changed, however, new problems, i.e., problems concerning the scrolling and the cursor operations, arise. For example, in Japanese Unexamined Patent Publication No. Hei 4-88545 is disclosed a palmtop information processing apparatus of a portrait display type. A rotary switch for cursor movement is provided on the left side of the main body of the information processing apparatus. The left circumferential edge of the rotary switch is exposed outside the main body for manual manipulation. The clockwise rotation or the counterclockwise rotation of the rotary switch, i.e., the vertical movement of the exposed portion when manually manipulated, shifts a cursor vertically, so that operation of the cursor is intuitively performed by a user. However, for an information processing apparatus having only a single rotary switch, when the display screen direction is changed, for example, from portrait to landscape, the degree of intuitiveness involved in the curser/scrolling operation is reduced. This is because when the apparatus is disposed horizontally, the exposed portion of the rotary switch must be rotated horizontally by a user, and this direction does not correspond to the screen scrolling direction, i.e., the vertical direction. It should be noted that the subject of Japanese Unexamined Patent Publication No. Hei 4-88545 does not include the conversion of the screen display direction.

The apparatus disclosed in Japanese Unexamined Patent Publication No. Hei 8-129557 provides four scroll keys that enable the scrolling operation to be performed vertically and horizontally, in four directions. The directions in which the respective scrolling key indicate are automatically converted in accordance with the display mode, so that the intuitiveness of the scrolling operation can be maintained, even when the screen display direction is changed from portrait to landscape or vice versa. However, according to the invention in this publication, maintenance of the intuitiveness involved in the scrolling operation is possible only by the provision of a plurality of scrolling keys, i.e., by increasing the number of components. In other words, the invention described in the above publication can not provide intuitive performance of the scrolling operation for an apparatus that has only one scroll operation means, such as a single rotary switch.

Conventionally, a keyboard or a pen is employed as an input device for a portable information terminal. It is difficult, however, to provide multiple keys because of the limitations imposed by the size of the apparatus. In addition, carrying a dedicated pen for input is inconvenient. Furthermore, a user must use both hands for an input operation when employing a keyboard or a pen, and this can result in suspension of ongoing job.

In other words, a function is required whereby intuitive data scrolling using only one hand is possible in either the portrait mode or the landscape mode.

SUMMARY OF THE INVENTION

To overcome the above shortcomings, it is one purpose of the present invention to provide a superior small information processing apparatus, having a relatively small display screen, that can change the arrangement of data on the display screen to the portrait mode or to the landscape mode.

It is another purpose of the present invention to provide a superior small information processing apparatus that can ensure the performance of an adequate data scrolling function for both the portrait and the landscape modes.

It is an additional purpose of the present invention to provide a superior small information apparatus that can implement an adequate data scrolling function for both the portrait and the landscape modes by using a single rotatable operating portion, that is a rotary switch.

In achieving the above purposes, a small information processing apparatus has a flat shaped main body adapted to be held in the hand of a user; a display screen provided on the front surface of the main body; and a rotatable manipulation member for directing the scrolling of data on the display screen, the manipulation member being provided on a corner of the main body so that the member is exposed relative to the two adjacent side walls. A display mode switch switches a display mode of the display screen between a first display mode and a second display mode. A scrolling direction control changes a scrolling direction of the data on the display screen in accordance with the display mode so that the data is intuitively and about proportionately scrolled with manipulation of the rotatable manipulation member.

In using a small information processing apparatus in accordance with the present invention, when data is displayed in either portrait or landscape mode on the display screen, a user can intuitively scroll the screen by employing a rotary switch provided at the left upper end of the main body of the apparatus. More specifically, in the portrait mode, when the rotary switch is rotated clockwise, i.e., upward along the left side of the apparatus, the data displayed in portrait mode is scrolled upward. When the rotary switch is rotated counterclockwise, i.e., downward along the left side of the apparatus, the data is scrolled downward on the screen. On the other hand, when the apparatus is disposed horizontally with the rotary switch is located at the left lower end, when the rotary switch is rotated clockwise, i.e., upward along the left side of the apparatus (corresponding to the upper side of the apparatus disposed in a vertical position), the data displayed in landscape mode is scrolled upward. When the rotary switch is rotated counterclockwise, i.e., downward along the left side of the apparatus, the data is scrolled downward on the screen. That is, either in the portrait mode or in the landscape mode, display data can be scrolled by intuitively manipulating the single rotary switch.

BRIEF DESCRIPTION OF THE DRAWINGS

Some of the purposes of the invention having been stated, others will appear as the description proceeds, when taken in connection with the accompanying drawings, in which:

FIG. 1 is a diagram illustrating a scrolling operation when a small information processing apparatus is placed in the vertical posture.

FIG. 2 is a diagram illustrating a scrolling operation when the small information processing apparatus is rotated counterclockwise 90° from the vertical posture in FIG. 1 to the horizontal posture.

FIG. 6 is a state transition diagram showing the operation characteristics of the portable information terminal 100, and more specifically, a state transition diagram in the main menu mode when the portable information terminal 100 is powered on.

FIG. 10 is a diagram for explaining the selection of an item on the main menu screen.

FIG. 15 is a specific diagram illustrating the condition where data are displayed in portrait on the display 11.

FIG. 16 is a diagram showing the condition where a pop-up menu is opened over data displayed in portrait.

FIG. 17 is a specific diagram illustrating the condition where data are displayed in landscape on the display 11.

FIG. 18 is a diagram showing the condition where a pop-up menu is opened over data displayed in the landscape mode.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 3:
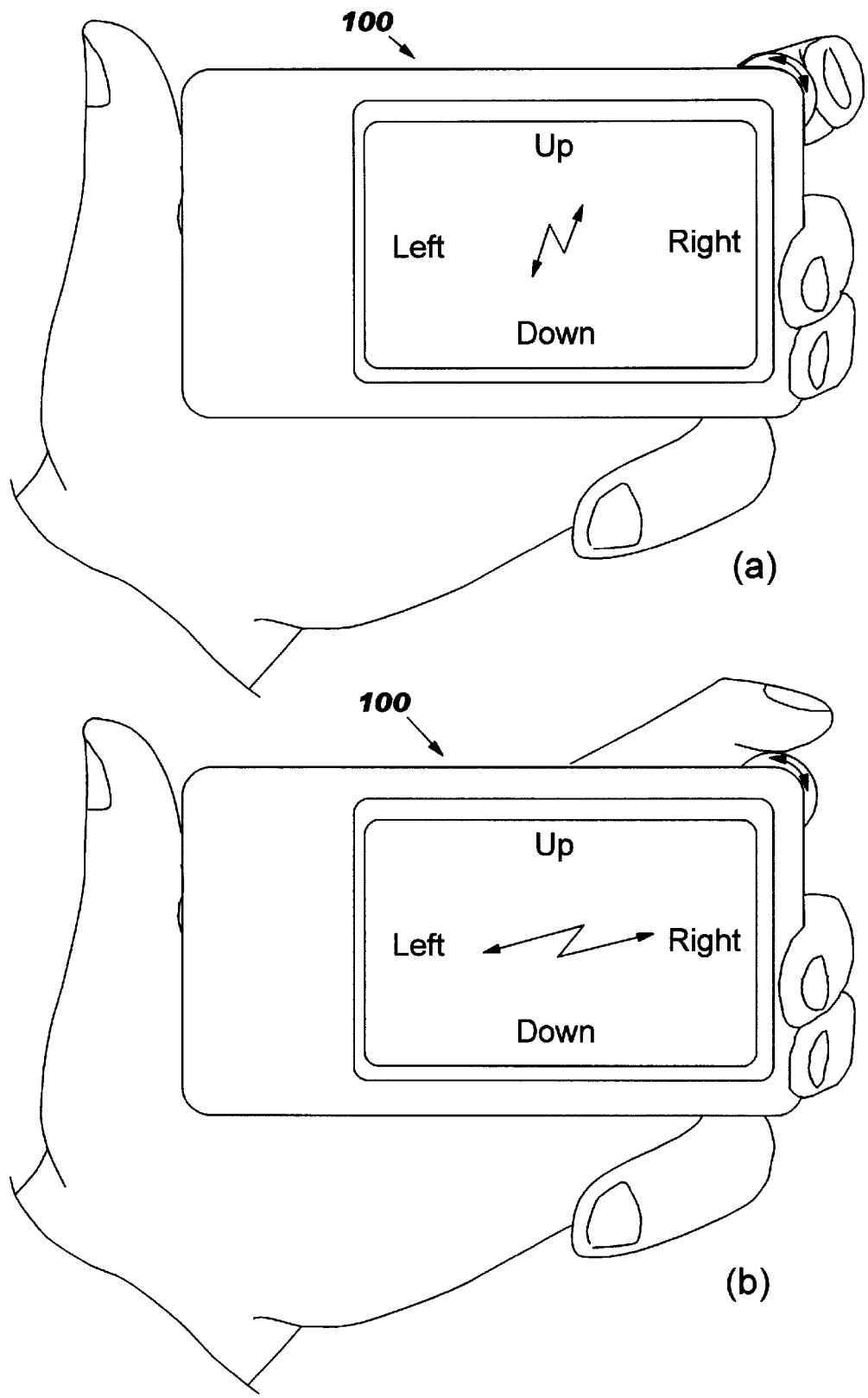
FIG. 3 is a diagram illustrating a scrolling operation when the small information processing apparatus is rotated clockwise 90° from the vertical posture in FIG. 1 to the horizontal posture.
Figure 4:
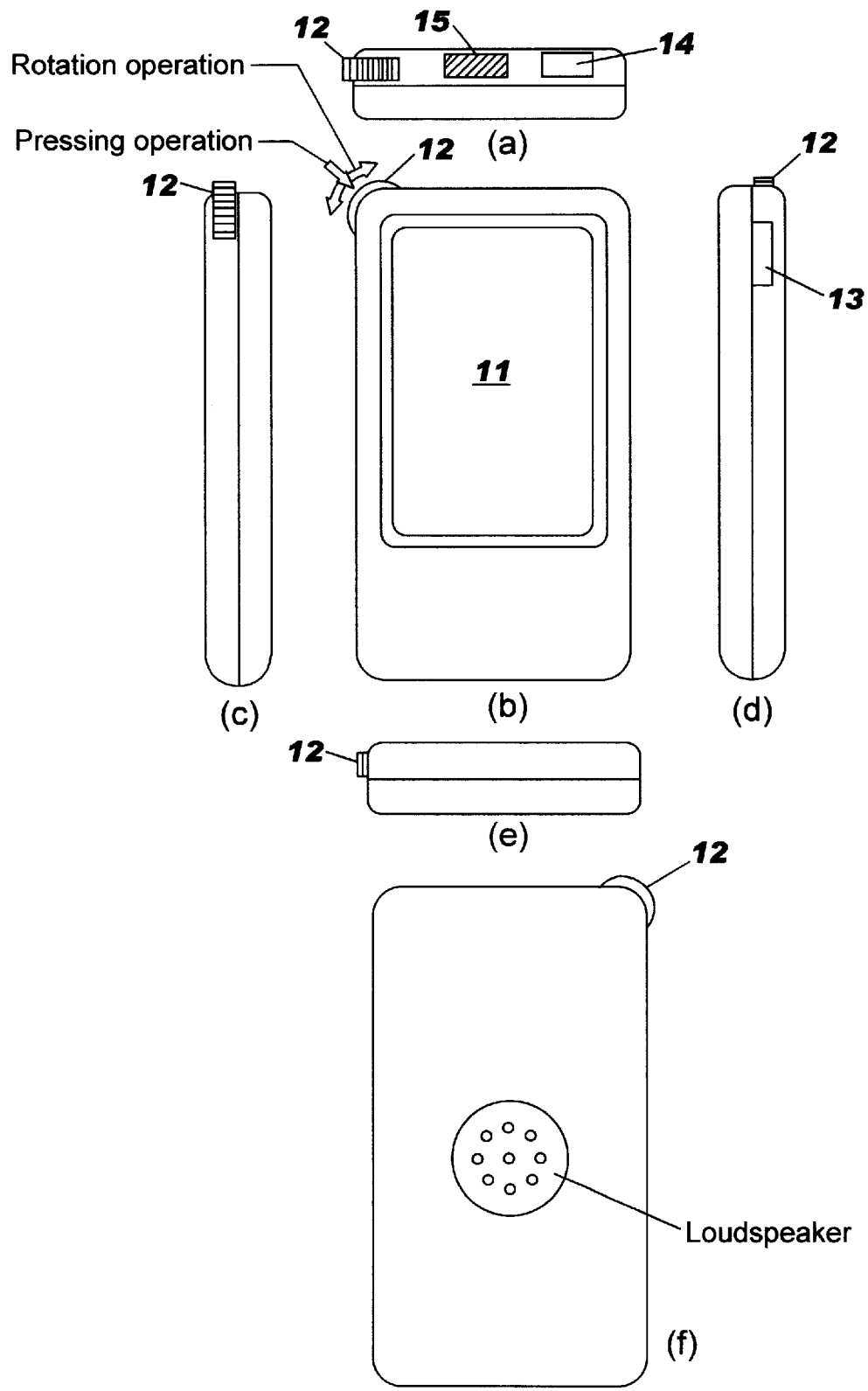
FIG. 4 is a six-sided view of the external appearance of a portable information terminal 100 according to the present invention, with (a), more specifically, being a top view, (b) being a front view, ⓒ being a left side view, (d) being a right side view, (e) being a bottom view, and (f) being a rear view.

The operation of the present invention will be specifically described while referring to FIGS. 1, 2 and 3. In FIG. 1 is shown a small information processing apparatus disposed in the vertical posture. As is shown in FIG. 1, the main body of the apparatus is thin, extended vertically, and has a display screen arranged almost in the center of the front face. "Up", "Down", "Left" and "Right" on the display screen indicate the scrolling direction for text displayed in the portrait mode. A rotary switch is provided at the left upper end of the main body, so that its manipulation portion is exposed relative to the left side and the upper side.

One embodiment of the present invention is a vertical scrolling operation using a rotary switch in the portrait mode. When displayed data are to be scrolled up, for example, the rotary switch need only to be rotated clockwise while the left thumb contacts the left side of the rotary switch, as is shown in FIG. 1(a). The manipulation of the rotary switch at this time is mainly its upward movement relative to the left side of the main body of the apparatus, so that the operation is intuitive and easy to be understood. When the displayed data are to be scrolled down, as is shown in FIG. 1(a), for example, the rotary switch need only to be rotated counterclockwise while the left thumb contacts the left side of the rotary switch. The manipulation of the rotary switch at this time is mainly its downward movement relative to the left side of the main body, so that this also is intuitive and easy to be understood.

Another embodiment of the present invention is a horizonal scrolling operation using a rotary switch while in the portrait mode. When displayed data are to be scrolled to the right, as is shown in FIG. 1(b), for example, a rotary switch need only to be rotated clockwise while the left thumb contacts the upper side of the rotary switch. The manipulation of the rotary switch at this time is mainly its rightward movement relative to the upper side of the main body, so that the operation is intuitive and easy to be understood. When displayed data are to be scrolled to the left, as is shown in FIG. 1(b), for example, the rotary switch need only to be rotated counterclockwise while the left thumb contacts the upper side of the rotary switch. The manipulation of the rotary switch at this time is mainly its leftward movement relative to the upper side of the main body, so that this also is intuitive and easy to understand. It should be noted, although not explained there, that the mode for the rotary switch must be switched, in advance, from vertical scrolling to horizontal scrolling.

Consider the condition when the small information processing apparatus is in the landscape mode, which it assumes when it is rotated counterclockwise 90° from the portrait mode in FIG. 1. As is shown in FIG. 2, the rotary switch is located at the left lower end of the main body when it is disposed in the horizontal posture. In the landscape mode, the "Up", "Down", "Left"and "Right" scrolling directions on the screen are changed, as is shown in FIG. 2. When displayed data are to be scrolled up, as is shown in FIG. 2(a), for example, a rotary switch need only to be rotated clockwise while the left thumb contacts the left side of the rotary switch. The manipulation of the rotary switch at this time is mainly its upward movement relative to the left side of the main body, so that the operation is intuitive and easy to be understood. When displayed data are to be scrolled down, as is shown in FIG. 2(a), for example, the rotary switch need only to be rotated counterclockwise while the left thumb contacts the left side of the rotary switch. The manipulation of the rotary switch at this time is mainly its downward movement relative to the left side of the main body, so that this also is intuitive and easy to be understood.

When displayed data are to be scrolled to the right, as is shown in FIG. 2(b), for example, a rotary switch need only to be rotated counterclockwise while the left thumb contacts the lower side of the rotary switch. The manipulation of the rotary switch at this time is mainly its rightward movement relative to the lower side of the main body, so that the operation is intuitive and easy to be understood. When displayed data are to be scrolled to the left, as is shown in FIG. 2(b), for example, the rotary switch need only to be rotated clockwise while the left thumb contacts the lower side of the rotary switch. The manipulation of the rotary switch at this time is mainly its leftward movement relative to the lower side of the main body, so that this also is intuitive and easy to be understood. It should be noted, although not explained there, that the mode for the rotary switch must be switched from vertical scrolling to horizontal scrolling.

Consider the condition when the small information processing apparatus is in the landscape mode, which it assumes when it is rotated clockwise 90° from the portrait mode in FIG. 1. As is shown in FIG. 3, the rotary switch is located at the right upper end of the main body when it is disposed in the horizontal position. In the landscape mode, the "Up", "Down", "Left" and "Right" scrolling directions on the screen are changed, as is shown in FIG. 3. When displayed data are to be scrolled up, as is shown in FIG. 3(a), for example, a rotary switch need only to be rotated counterclockwise while the left index finger contacts the right side of the rotary switch. The manipulation of the rotary switch at this time is mainly its upward movement relative to the right side of the main body, so that the operation is intuitive and easy to be understood. When displayed data are to be scrolled down, as is shown in FIG. 3(a), for example, the rotary switch need only to be rotated clockwise while the left index finger contacts the right side of the rotary switch. The manipulation of the rotary switch at this time is mainly its downward movement relative to the right side of the main body, so that this also is intuitive and easy to be understood.

When displayed data are to be scrolled to the right, as is shown in FIG. 3(b), for example, a rotary switch need only to be rotated clockwise while the left index finger contacts the upper side of the rotary switch. The manipulation of the rotary switch at this time is mainly its rightward movement relative to the upper side of the main body, so that the operation is intuitive and easy to be understood. When displayed data are to be scrolled to the left, as is shown in FIG. 3(b), for example, the rotary switch need only to be rotated counterclockwise while the left index finger contacts the upper side of the rotary switch. The manipulation of the rotary switch at this time is mainly its leftward movement relative to the upper side of the main body, so that this also is intuitive and easy to be understood. It should be noted, although not explained there, that the display scroll mode must be switched from vertical scrolling to horizontal scrolling, which will be described later.

According to the present invention, since displayed data are scrolled only by the rotational manipulation of the rotary switch, the volume and the velocity of the scrolling can be intuitively adjusted in accordance with the rotated volume and the angular velocity of the rotary switch, so that the scrolling operation can be enhanced.

FIGS. 4(a) through 4(f) are six side views of the external appearance of a portable information terminal 100 appropriate for implementing the present invention.

The portable information terminal 100 is a flat, rectilinear structure 95.5 mm high×54 mm wide×14 mm deep, and is light enough to be held by only the left hand. Hereinafter, the condition wherein the main body of the terminal 100 is placed in a vertical posture is called the portrait mode, and the condition wherein the terminal 100 is placed in a horizontal posture is called the landscape mode.

An 8-bit CPU, a flash memory, a loudspeaker, an infrared transmitter/receiver, and as a power source, two AAA batteries (not shown; see sub-division B) are stored in the main body of the terminal 100.

A liquid crystal display 11 of 320×200 dots (20 characters×12 lines in full-sized Japanese characters) is provided almost in the center of the front of the main body of the terminal 100. Various types of data are displayed either in portrait or in landscape mode on the display 11, which will be described later. The displayed data are, for example, the regular newspaper articles; Web pages, such as the Stock Market, the Weather and the Traffic Information; and text data constituting PIM data, such as a Phone Book, an Address Book, a calendar or schedules.

In order to provide a rotatable manipulation member directing the scrolling and selection of data displayed on said display screen, a dial rotary switch 12 is mounted on the apparatus housing at the left upper end of the terminal 100 so that said member is exposed relative to two adjacent side walls, i.e., at a location upon which a thumb abuts when the terminal 100 is held in the left hand. The edge drive encoder "EVQWK" produced by Panasonic, for example, can be used as the rotary switch 12. The rotary switch 12, which can be rotated both clockwise (CW) and counterclockwise (CCW), generates a pulse in accordance with a rotated volume, and functions as a rotary encoder. Each time the rotary switch 12 is rotated through an angle of 24 degrees, a clicking sensation is generated. In addition, the rotary switch 12 when pressed radially is used for ON/OFF input, and when it is pressed, it also generates a clicking sensation. Thus the rotary switch includes a rotation sensor responsive to rotation of the manipulation member and effectuating scrolling and a pressure sensor responsive to pressure applied against the manipulation member and effectuating program selection.

The available manipulations using the rotary switch 12 are "rotation", "pressing", "continuous pressing", and "pressing and rotation". When these manipulations are utilized, a pointing device, such as a mouse, can be emulated, and "point", "click", "double click", "press" and "drag" operations as known from the functions of previously available operating systems and applications programs used with conventional desktop computer systems are performed.

A pointing operation as if using a mouse can be performed by rotating the rotary switch 12. By rotating the rotary switch 12, the data on a screen 11 can be scrolled equivalently to the rotation direction and the rotated volume. The scrolling direction can be set or switched to either a vertical direction or a horizontal direction by employing a predetermined operation, which will be described later. A minimum scrolling unit can be set or switched to either a column/row, or to a page by employing a predetermined operation, which will be also described later. A displayed cursor can be moved to any item in a menu (a pop-up menu) on the screen 11 by the rotation of the rotary switch 12. The rotation of the dial is one dimensional, and a corresponding operation can be intuitively and easily understood.

A clicking operation, such as is performed when using a mouse, can be performed by pressing the rotary switch 12 momentarily. This clicking operation can be assigned, for example, for the selection of a menu item. In addition, a selection effected by clicking can be canceled out by depressing a cancel button 13 (which will be described later) that is provided on the opposite side of the rotary switch 12.

Pressing is an operation whereby the rotary switch 12 is continuously pressed for a predetermined period (e.g., two seconds). The pressing operation can be assigned for the powering the portable information terminal 100 ON/OFF, for example.

A dragging operation can be performed by rotating the rotary switch 12 while it is pressed. The dragging operation can be used for the selection or the movement of consequent objects or a group of objects displayed, for example, in a window on the screen 11 (e.g., a character string).

The cancel button 13 is provided on the right side of the terminal 100, i.e., at the location the index finger touches when the terminal 100 is held in the left hand. A function corresponding to the "ESC (escape)" key on a keyboard is assigned to the cancel button 13, which assists in the selection operation using the rotary switch 12. The reason the cancel button 13 is so arranged is that usability is enhanced by providing a separate dedicated switch for an operation, such as cancellation of the menu, that is relatively frequently performed. See sub-division C for a cooperative operation using the rotary switch 12 and the cancel button 13.

A scroll mode select switch 14 is arranged on the right upper face of the terminal 100 for selecting the unit for scrolling data on the display screen 11, either a column or a page (vertical direction), or a row or a page (horizontal direction).

An IR receiver 15 is located almost in the center of the upper face of the terminal 100 for exchanging infrared data with an external information processing apparatus.

It should be noted that the manipulation portion of the rotary switch 12, which is provided at the left upper end of the terminal 100, is exposed relative to the left side and the upper side of the terminal 100. This can be confirmed from the fact that the rotary switch 12 is shown both in the top view in FIG. 4(a) and in the left side view in FIG. 4(c).

Figure 5:
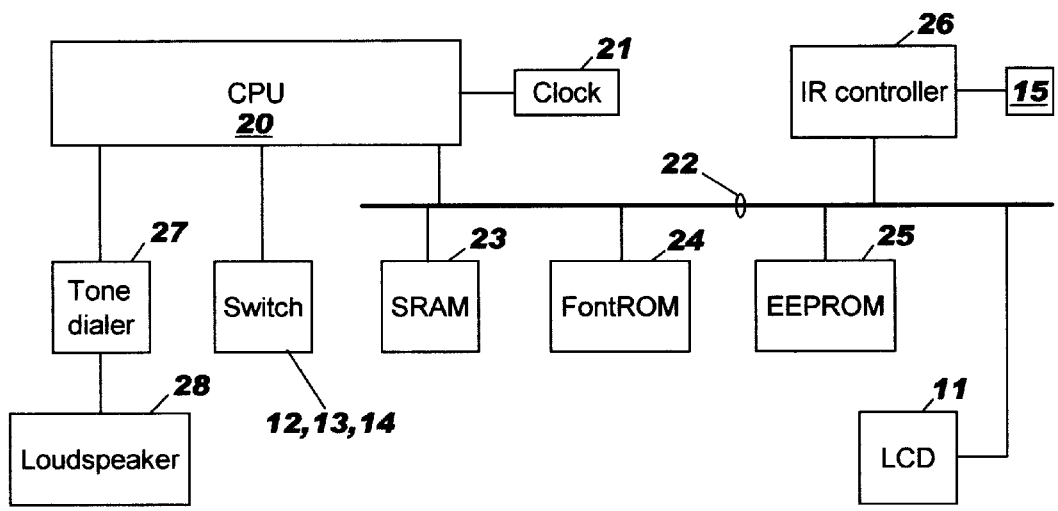
FIG. 5 is a block diagram illustrating the internal hardware arrangement of the portable information terminal 100.

FIG. 5 is a schematic diagram illustrating the hardware arrangement of the portable information terminal 100.

A CPU 20, which is a main controller, is activated based on an operating clock supplied by a clock oscillator 21. The CPU 20 may be 8-bit microcomputer "SMC-88112" produced by Seiko Epson Corp. The external pin of the CPU 20 is coupled to an internal bus 22, and is mutually connected to the respective sections via the internal bus 22.

An SRAM 23 is a random access memory that does not require a refresh operation, and is mainly used as a work area for the CPU 20. A FontROM 24 is a read only memory in which are stored character images (i.e., fonts) that can be displayed on a liquid crystal display (LCD) panel 11. In the FontROM 24, portrait fonts and landscape fonts may be respectively stored as tables to cope with both portrait display and landscape display. An EEPROM 25 is a read only memory that is data erasable only under a given condition, and is used mainly for permanently storing control codes for operating the respective hardware sections, and security data, such as a serial number. The operation of the terminal 100 in accordance with the present invention can be provided as control codes in the EEPROM 25.

An IR controller 26 is a dedicated controller chip for processing IR data received or sent by an IR receiver 15, and for fetching the processed data as computer data.

The reference number 11 indicates a liquid crystal display panel as an output device. The CPU 20 employs a font image in the FontROM 24 to drive the display panel 11.

As was previously described, the rotary switch 12, the cancel button 13 and the scroll mode select switch 14 are input devices that are provided for the terminal 100. Based on the control codes, the CPU 20 interprets data input using the rotary switch 12, the cancel button 13 and the scroll mode select switch 14, and controls data on the display 11 (e.g., scrolls the data). The CPU 20 permits a tone dialer 27 to issue sounds having a predetermined wavelength through a loudspeaker 28.

Many more electric circuits other than those in FIG. 5 are required to constitute the portable information terminal 100. However, since these components are well known by one having ordinary skill in the art, and are not directly related to the subject of the present invention, no explanation for them will be given in this specification. In addition, to avoid complexity in the drawings, the connections between the hardware blocks in the drawings are only partially shown.

The hardware and the software arrangements for the portable information terminal 100 of the present invention have been explained in the above. In what immediately follows, the operation of the portable information terminal 100 and the processing of the present invention will be described while referring to FIGS. 6 through 18.

Figure 6:
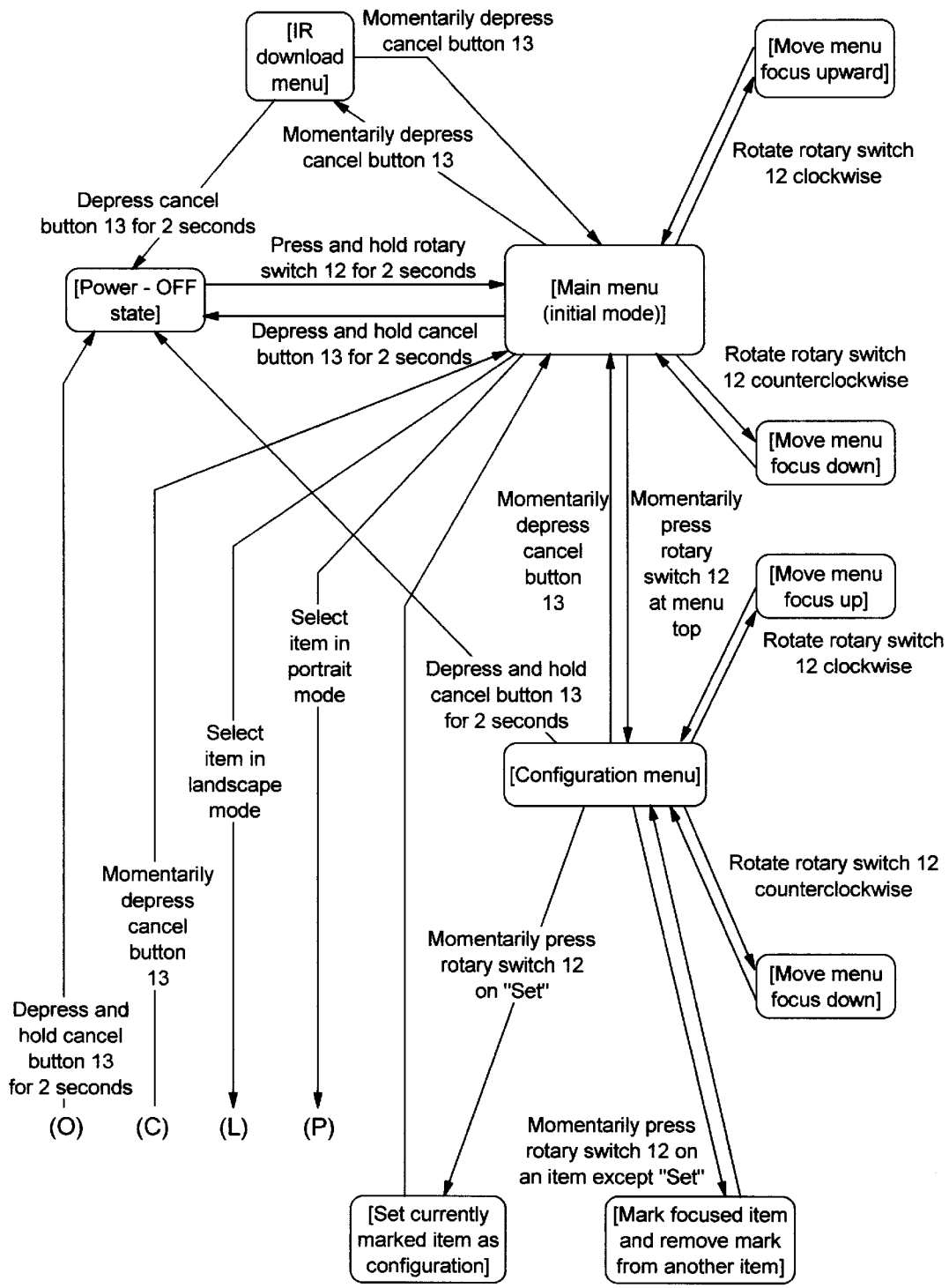

FIG. 6 is a state transition diagram showing the operation characteristics in the initial mode (main menu) when the portable information terminal 100 is powered on. The operations shown in each state are implemented, for example, as control codes stored in the EEPROM 25.

When the rotary switch 12 is depressed for two seconds in the power-OFF state, the terminal 100 is powered on and set to the initial mode, and the main menu is displayed on the display 11. When the cancel button 13 is pressed for two seconds in the initial mode, the terminal 100 is returned to the OFF state.

Figure 9:
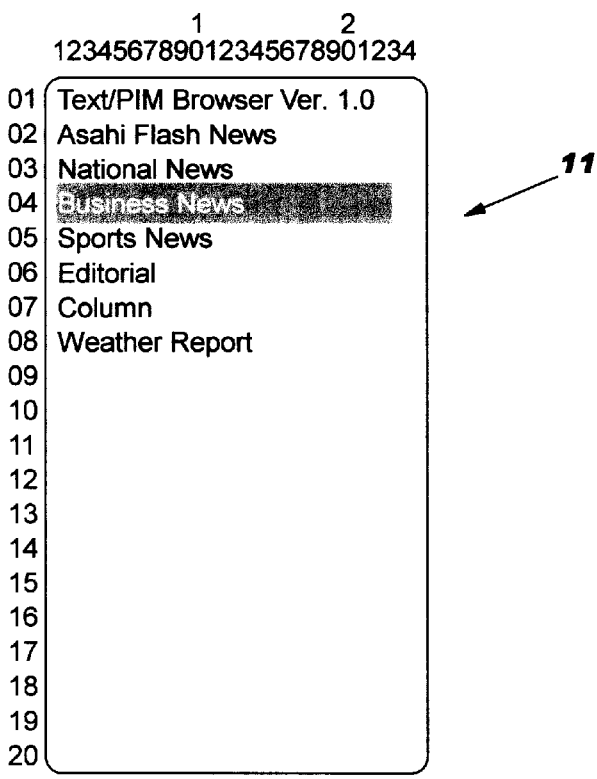
FIG. 9 is a schematic diagram showing the main menu on a display 11.

FIG. 9 is a schematic diagram showing the main menu on the display 11. As is shown in FIG. 9, in the initial mode, portrait display is set as a default. In the main menu, not only configuration menu "Text/PIM Browser Ver 1.0" at the topmost, but also "Asahi Flash News", "National News", "Business News", and the like are displayed. It should be noted that menu items other than the configuration menu are user-programmable, and the addition, deletion and alteration of them are possible.

Figure 11:
FIG. 11 is a diagram for explaining the selection of an item on the main menu screen.

The item in the main menu that is currently being selected is highlighted (or menu-focused). In FIG. 9, "Business News" is selected. In this state, when a user rotates the rotary switch 12 clockwise by volume equivalent to one click, the menu focus can be shifted upward one level. In this case, the menu focus is moved to "National News", one level above, as is shown in FIG. 10. When the rotary switch 12 is rotated counterclockwise by volume equivalent to one click, the menu focus can be shifted down one level. In this case, the menu focus is moved to "Sports News", one level below, as is shown in FIG. 11. In short, the menu focus is shifted in accordance with the rotational direction and volume.

When the rotary switch 12 is pressed once more while the menu focus is placed on a desired item, the highlighted menu item is selected, and the screen is changed to a display of data for the selected item. For example, when configuration menu "Text/PIM Browser Ver 1.0" at the top is menu focused and the rotary switch 12 is then pressed, the display screen changes to that for the configuration menu in FIG. 12. When "National News" is menu focused and the rotary switch 12 is then pressed, the display screen is changed to that for local news documents (not shown). The configuration menu is defined as a menu screen for setting the display arrangement on the display 11 (see the next paragraph).

Figure 12:
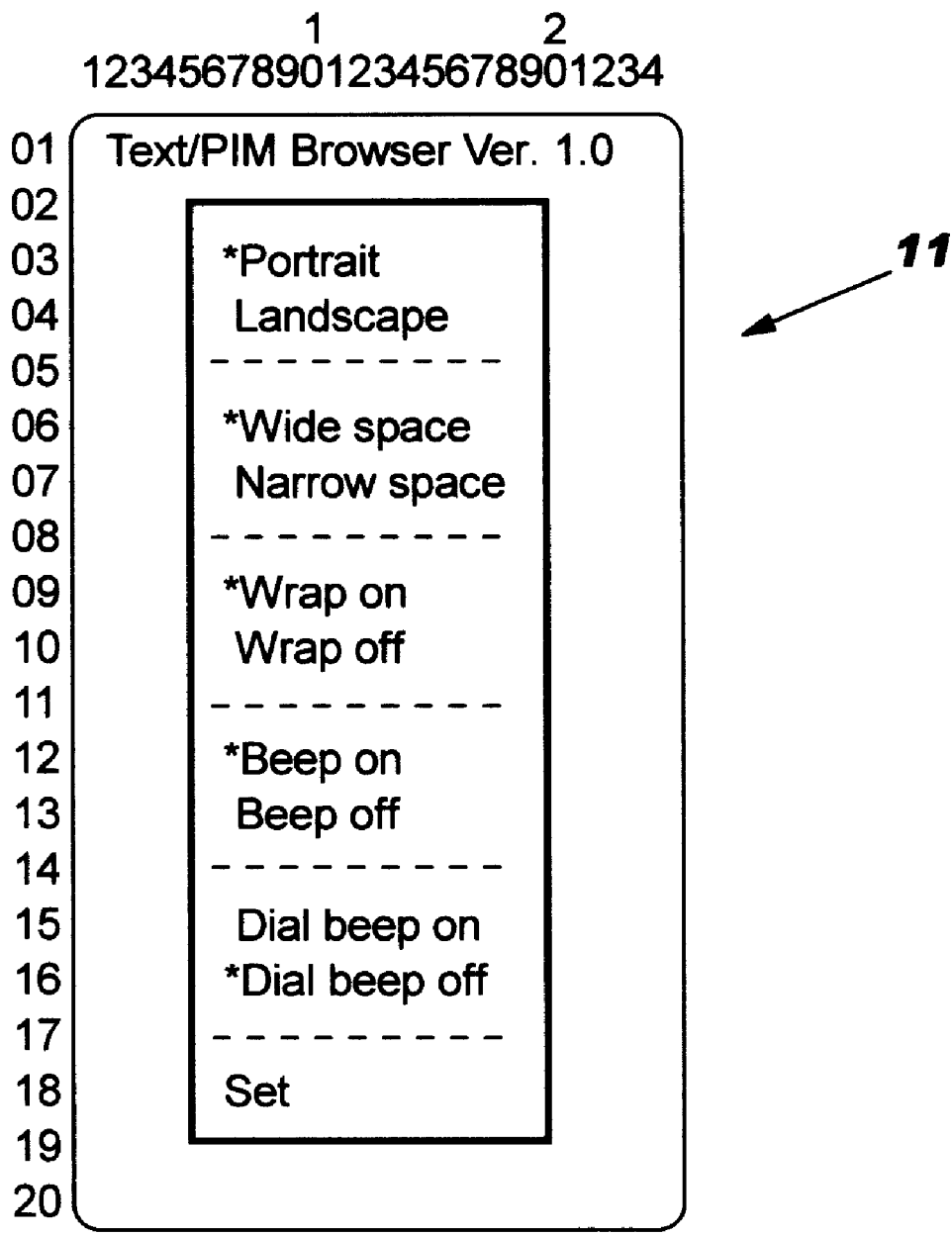
FIG. 12 is a diagram for explaining the selection of an item on a configuration menu screen.

As is shown in FIG. 12, for the configuration menu screen are prepared "Portrait/Landscape", for selecting either portrait or landscape for display; "Wide space/Narrow space", for selecting a line space; "Wrap on/Wrap off", for setting or canceling automatic return; "Beep on/Beep off", for generating or halting generation of a beep sound during processing; and "Dial beep on/Dial off", for generating or halting generation of a dial beep sound. Each menu item is an alternative selection, and an asterisk ("*") is added as a prefix to the currently selected item. In FIG. 12, "Portrait", "Wide space", "Wrap on", "Beep on" and "Dial beep off" are selected. It should be noted that each menu item is constituted by a pair of opposite setting items, and one of them is alternatively selected.

Figure 13:
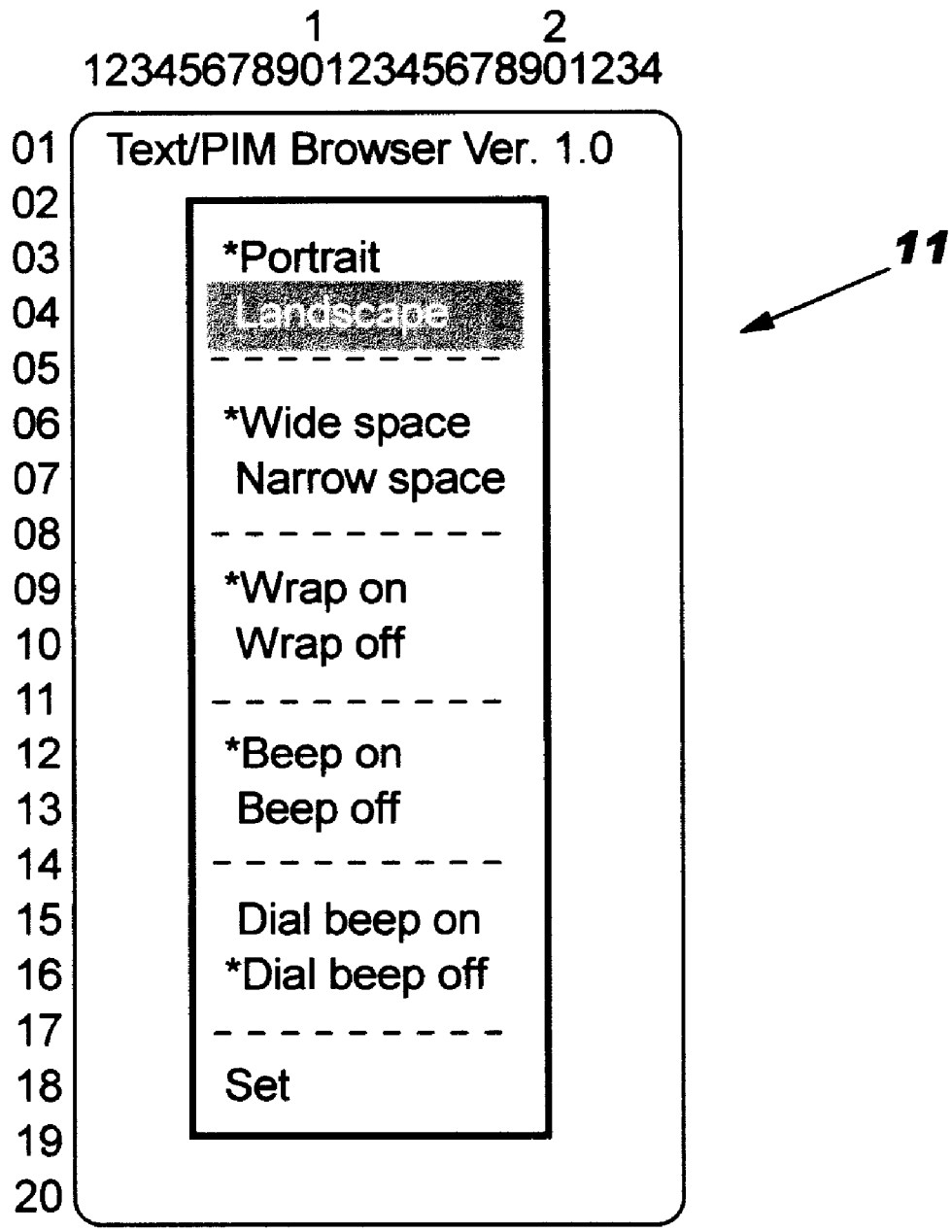
FIG. 13 is a diagram for explaining the selection of an item on the configuration menu screen.
Figure 14:
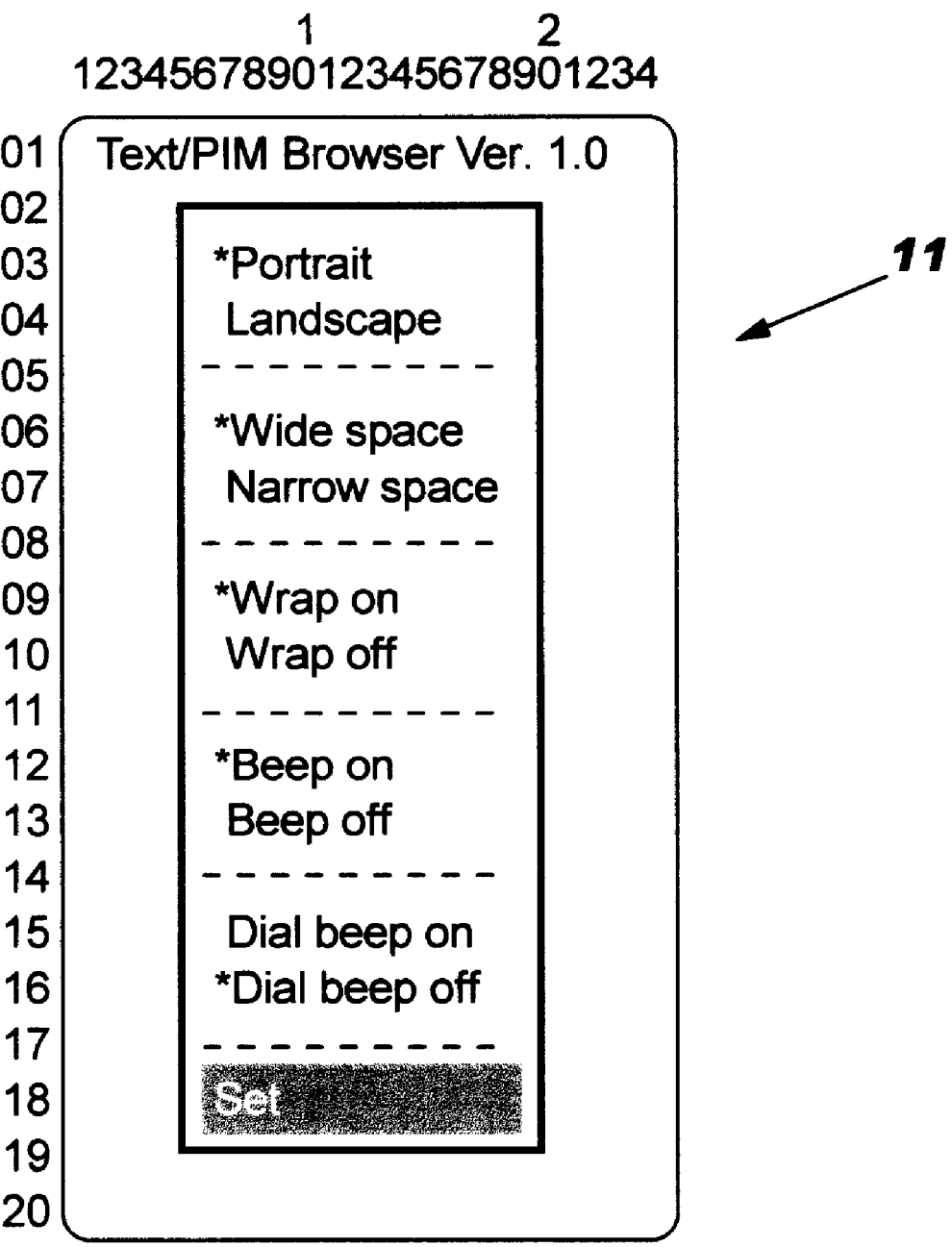
FIG. 14 is a diagram for explaining the selection of an item on the configuration menu screen.

The setting and changing of the configuration will now be described by employing, as an example, a case where the portrait display is changed to the landscape display. When the rotary switch 12 is rotated, the menu focus is moved on the configuration menu screen in accordance with the rotation direction and volume. This is substantially the same as that on the main menu, as was previously described. First, the rotary switch 12 is rotated to move the focus menu to item "Landscape" (FIG. 13). Then, the rotary switch 12 is pressed. As a result, the display mode is changed to the landscape mode. The asterisk is added in front of "Landscape" and the asterisk in front of the paired "Portrait" is removed (not shown).

After the configuration has been selected as desired, the menu focus should be moved to "Set" at the lower most of the menu, and the rotary switch 12 is pressed. Then, the items to which the asterisks are appended are set as the current configurations, and the screen is returned to the main menu.

The main menu screen will be described while again referring to FIG. 9. When the rotary switch 12 is pressed momentarily while the menu focus is placed on a menu item other than the configuration menu, it is determined that the item at the menu focus is selected, and the screen is changed to display data for the selected menu item. When, for example, the rotary switch 12 is pressed in the state shown in FIG. 9, "Business News" is selected and the document for that item is displayed on the display 11 in accordance with the setting for the configuration (not shown). When the display is set to "Portrait" in the configuration, the display mode is changed to the portrait mode (arrow (P) in FIGS. 6 and 7: see sub-division C-2). When the display is set to "Landscape" in the configuration, the display mode is changed to the landscape mode (arrow (L) in FIGS. 6 and 8: see sub-division C-3).

When the cancel button 13 is depressed momentarily in the main menu mode, the mode is changed to a data download mode using infrared (IR) communication. In the data download mode, desired data can be acquired via IR communication from an external host PC (assuming that the host PC has an IR transmission function and data for downloading). The acquired data include daily news articles; Web pages, such as Stock Market, Weather and Traffic Information; and text data, such as PIM data for a Phone Book, an Address Book, a calendar and schedules, and are employed as the contents of respective menu items. It should be noted that the menu items are user programmable, and the addition, deletion and alteration for them are possible. To return from the infrared communication mode to the main menu mode, the cancel button 13 need only to be depressed once more. See sub-division D for the details of the data download operation.

When the cancel button 13 is depressed and held for two-seconds in the IR data download mode or in the configuration menu mode, the terminal 100 is powered off.

Figure 7:
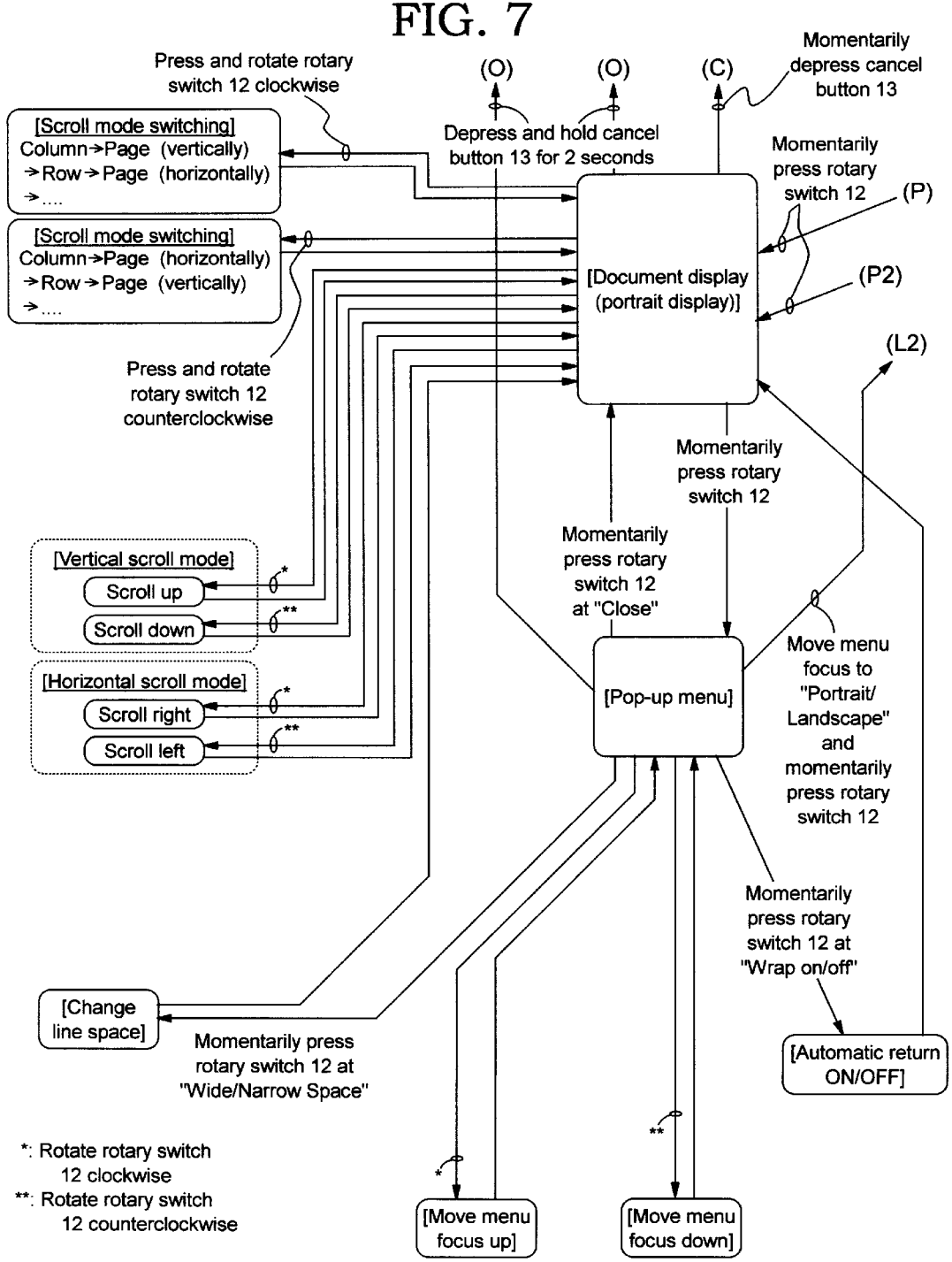
FIG. 7 is a state transition diagram showing the operation characteristics of the portable information terminal 100, and more specifically, a state transition diagram in the portrait mode.

FIG. 7 is a state transition diagram showing the operation characteristics of the portable information terminal 100 in the portrait mode. The operations shown in FIG. 7 are performed, for example, using control codes stored in the EEPROM 25. In the portrait mode, a user holds the terminal 100 in the manner shown in FIG. 1 while the left thumb contacts the rotary switch 12.

When the configuration is set to the portrait display and when a desired item on the main menu is selected, i.e., when the menu focus is placed on an item and the rotary switch 12 is pressed momentarily, data for the selected item are displayed in the portrait mode (arrow (P) in FIGS. 6 and 7). When the configuration is changed in the landscape mode (which will be described later), and when the highlighted item is selected by pressing the rotary switch 12 momentarily, the data display is changed from landscape to portrait (arrow (P2) in FIGS. 7 and 8).

FIG. 15 is a specific diagram showing the condition where data are displayed in portrait mode on the display 11. It should be understood that the alphabetical strings shown on the display screen indicate the direction of the displayed characters. In this state, when the cancel button 13 is depressed momentarily, the screen is returned to the main menu mode (arrow (C) in FIGS. 6 and 7). When the cancel button 13 is depressed and held for two seconds, the terminal 100 is powered off (arrow (O) in FIGS. 6 and 7).

When the rotary switch 12 is pressed once more in the portrait mode, as is shown in FIG. 16, a pop-up menu is opened on the display 11. The pop-up menu is provided so that the setting of the configurations can be dynamically changed without entering the configuration menu mode.

The shifting of the menu focus on the pop-up menu is performed in the same way as for the main menu mode. More specifically, the menu focus is moved up by one level each time the rotary switch 12 is rotated clockwise by volume equivalent to one click. The menu focus is moved down by one level each time the rotary switch 12 is rotated counterclockwise by volume equivalent to one click. In FIG. 16, the menu focus is placed on "Portrait/Landscape". When the setting of the configuration is changed on the pop-up menu (see the next paragraph) or when the rotary switch 12 is pressed momentarily on item "Close", the pop-up menu is closed and the document display screen for which the configuration is changed appears. When the cancel button 13 is depressed and held for two seconds while the pop-up menu is being displayed, the terminal 100 is powered off (arrow (O) in FIGS. 6 and 7).

When the menu focus is moved to "Portrait/Landscape" on the pop-up menu, and when the rotary switch 12 is pressed momentarily, the display mode is changed from portrait to landscape mode, as shown in FIG. 17. The program control is changed to the landscape display mode (arrow (L2) in FIGS. 7 and 8, which will be described later).

When the menu focus is placed on "Wrap on/off" on the pop-up menu, and the rotary switch 12 is pressed momentarily, the current automatic return ON state is switched to the OFF state, or the current automatic return OFF state is switched to the ON state, and the data display is changed.

When the menu focus is placed on "Wide/Narrow space" on the pop-up menu and the rotary switch 12 is pressed momentarily, the line space is changed from wide to narrow or from narrow to wide. The configuration is easily altered simply by the operation of the rotary switch 12 because each menu item for the configuration consists of a pair of alternative items.

When data of the selected menu item is displayed, the scroll mode can be switched by rotating the rotary switch 12 while pressing it. The scroll mode, in this context, means the scroll direction and the scrolling volume corresponding to one operation. Each time the rotary switch 12 is rotated clockwise by volume equivalent to one click, the scroll mode is changed from column (e.g., by character in the horizontal direction) to page (horizontally by screen), to row (vertically by row), to page (vertically by screen) and to column. Each time the rotary switch 12 is rotated counterclockwise by volume equivalent to one click, the scroll mode is changed from column, to page (vertical direction), to row, to page (horizontal direction), and then to column in turn. The mode select button 14 can be assigned for the scroll mode selection, but no detailed explanation will be given.

The data scrolling is easily performed by using the left thumb. For scrolling up in the vertical scroll mode (including both by row and by page), the rotary switch 12 is rotated clockwise. For scrolling down in the vertical scroll mode, the rotary switch 12 is rotated counterclockwise (see FIG. 1(a)). In this case, the clockwise rotation of the rotary switch 12 is similar to rubbing upward along the left side of the terminal 100, and the counterclockwise rotation of the rotary switch 12 is similar to rubbing downward along the left side of the terminal 100. In other words, the direction in which the switch 12 is rotated corresponds to the scrolling direction on the screen, so that the manipulation can be intuitively performed.

For scrolling to the right in the horizontal scroll mode (including both by column and by page), the rotary switch 12 is rotated clockwise. For scrolling to the left in the horizontal scroll mode, the rotary switch 12 is rotated counterclockwise (see FIG. 1(b)). In this case, the clockwise rotation of the rotary switch 12 is similar to rubbing to the right along the upper side of the terminal 100, and the counterclockwise rotation of the rotary switch 12 is similar to rubbing to the left along the upper side of the terminal 100. In other words, the direction in which the switch 12 is rotated corresponds to the scrolling direction on the screen, so that the manipulation can be intuitively performed.

Figure 8:
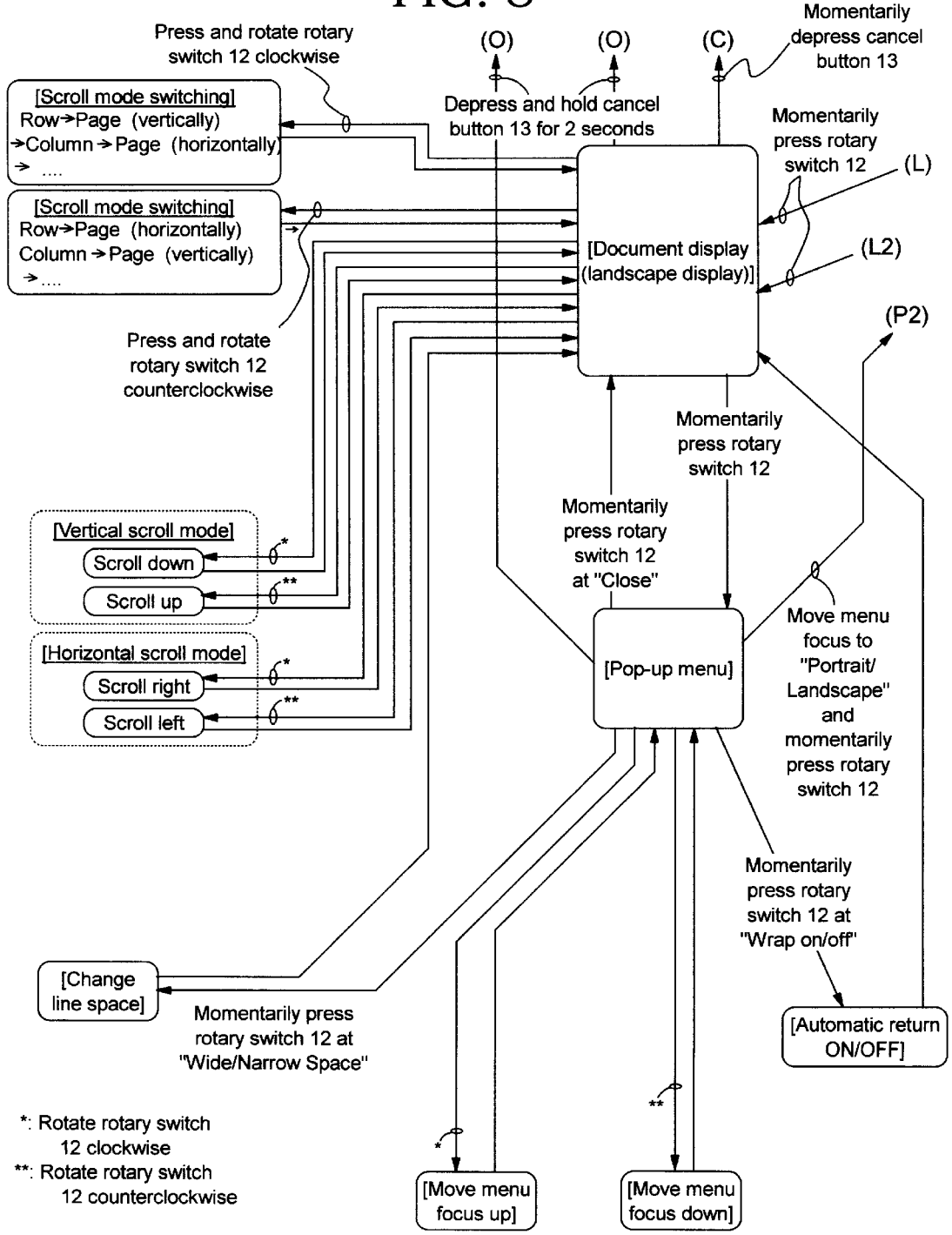
FIG. 8 is a state transition diagram showing the operation characteristics of the portable information terminal 100, and more specifically, a state transition diagram in the landscape mode.

FIG. 8 is a state transition diagram showing the operation characteristics of the portable information terminal 100 in the landscape mode. The operations shown in FIG. 8 are performed, for example, using control codes stored in the EEPROM 25. In the landscape mode, a user holds the terminal 100 in the manner shown in FIG. 3 while the left index finger contacts the rotary switch 12.

When the configuration is set to the landscape display and when a desired item on the main menu is selected, i.e., when the menu focus is placed on an item and the rotary switch 12 is pressed momentarily, data for the selected item are displayed in landscape mode (arrow (L) in FIGS. 6 and 8). When the configuration is changed in the portrait mode (which will be described later), and when the highlighted item is selected by pressing the rotary switch 12 momentarily, the data display is changed from portrait to landscape (arrow (L2) in FIGS. 7 and 8).

FIG. 17 is a specific diagram showing the condition where data are displayed in landscape mode on the display 11. It should be understood that the alphabetical strings shown on the display screen indicate the direction of the displayed characters. In this state, when the cancel button 13 is depressed momentarily, the screen is returned to the main menu mode (arrow Ⓒ in FIGS. 6 and 8). When the cancel button 13 is depressed and held for two seconds, the terminal 100 is powered off (arrow (O) in FIGS. 6 and 8).

When the rotary switch 12 is pressed once more in the landscape mode, as is shown in FIG. 18, a pop-up menu is opened on the display 11. The pop-up menu is provided so that the setting of the configurations can be dynamically changed without entering the configuration menu mode.

The shifting of the menu focus on the pop-up menu is performed in the same way as for the main menu mode. More specifically, the menu focus is moved up by one level each time the rotary switch 12 is rotated counterclockwise by volume equivalent to one click. The menu focus is moved down by one level each time the rotary switch 12 is rotated clockwise by volume equivalent to one click. In FIG. 18, the menu focus is placed on "Portrait/Landscape". When the setting of the configuration is changed on the pop-up menu (see the next paragraph) or when the rotary switch 12 is pressed momentarily on item "Close", the pop-up menu is closed and the document display screen for which the configuration is changed appears. When the cancel button 13 is depressed and held for two seconds the pop-up menu is being displayed, the terminal 100 is powered off (arrow (O) in FIGS. 6 and 8).

When the menu focus is moved to "Portrait/Landscape" on the pop-up menu, and when the rotary switch 12 is pressed momentarily, the display mode is changed from landscape to portrait mode, as shown in FIG. 15. The program control is changed to the portrait display mode (arrow (P2) in FIGS. 7 and 8, previously described).

When the menu focus is placed on "Wrap on/off" on the pop-up menu, and the rotary switch 12 is pressed momentarily, the current automatic return ON state is switched to the OFF state, or the current automatic return OFF state is switched to the ON state, and the data display is changed.

When the menu focus is placed on "Wide/Narrow space" on the pop-up menu and the rotary switch 12 is pressed momentarily, the line space is changed from wide to narrow or from narrow to wide. The configuration is easily altered simply by the operation of the rotary switch 12 because each-menu item for the configuration consists of a pair of alternative items.

When data of the selected menu item is displayed, the scroll mode can be switched by rotating the rotary switch 12 while pressing it. The scroll mode means the scroll direction and the scrolling volume corresponding to one operation. Each time the rotary switch 12 is rotated clockwise by volume equivalent to one click, the scroll mode is changed from row (e.g., by row in the vertical direction) to page (vertically by screen), to column (horizontally by character), to page (horizontally by screen) and to row. Each time the rotary switch 12 is rotated counterclockwise by volume equivalent to one click, the scroll mode is changed from row, to page (horizontal direction), to column, to page (vertical direction), and then to row in turn. The mode select button 14 can be assigned for the scroll mode selection, but no detailed explanation will be given.

The data scrolling is easily performed by using the left index finger. For scrolling up in the vertical scroll mode (including both by row and by page), the rotary switch 12 is rotated counterclockwise. For scrolling down in the vertical scroll mode, the rotary switch 12 is rotated clockwise (see FIG. 3(*a*)). In this case, the counterclockwise rotation of the rotary switch 12 is similar to rubbing upward along the right side of the terminal 100, and the clockwise rotation of the rotary switch 12 is similar to rubbing downward along the right side of the terminal 100. In other words, the direction in which the switch 12 is rotated corresponds to the scrolling direction on the screen, so that the manipulation can be intuitively performed.

For scrolling to the right in the horizontal scroll mode (including both by character and by page), the rotary switch 12 is rotated clockwise. For scrolling to the left in the horizontal scroll mode, the rotary switch 12 is rotated counterclockwise (see FIG. 3(*b*)). In this case, the clockwise rotation of the rotary switch 12 is similar to rubbing to the right along the upper side of the terminal 100, and the counterclockwise rotation of the rotary switch 12 is similar to rubbing to the left along the upper side of the terminal 100. In other words, the direction in which the switch 12 is rotated corresponds to the scrolling direction on the screen, so that the manipulation can be intuitively performed.

As is described above, the portable information terminal 100 comprises the infrared (IR) communication function. That is, when the cancel button 13 is momentarily pressed in the initial mode when the main menu has been opened, the terminal 100 is changed to the IR reception mode. The reasons for performing infrared communication are that a cable connection is not required, that a communication module is small, light and inexpensive, and that there are no radio regulations and restrictions imposed by licensing. IR communication between the portable information terminal 100 and a host PC will now be described.

Figure 19:
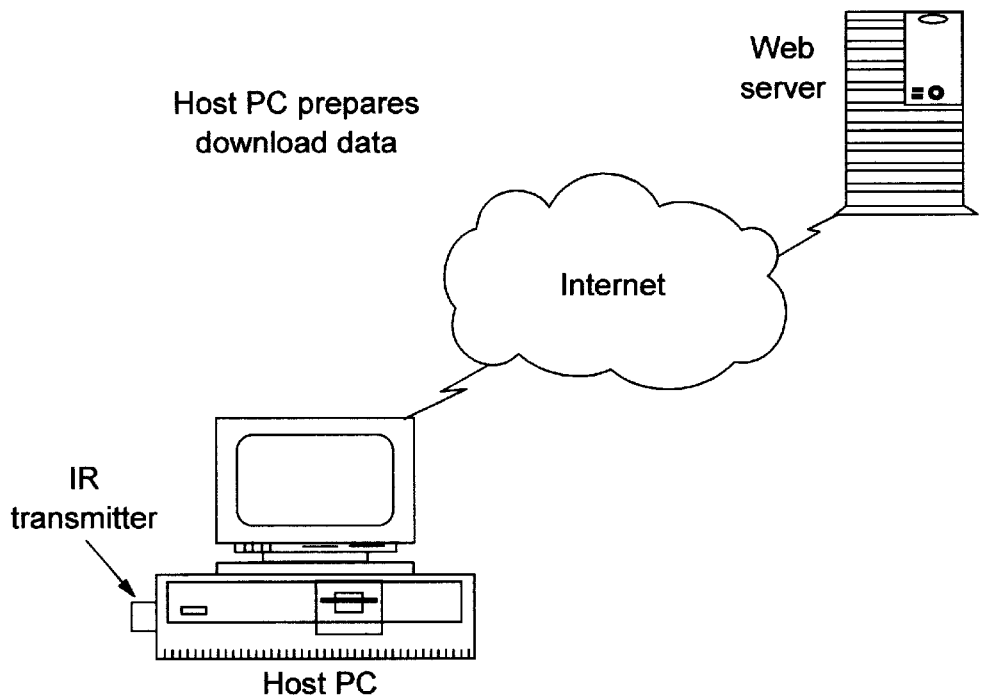
FIG. 19 is a specific diagram showing the IR communication operation between a host PC and a portable information terminal 100, and more specifically, showing the condition where the host PC prepares data to be downloaded.

The downloaded data include, for example, regular news articles, Web pages for the Stock Market, Weather and Traffic Information, and PIM data for a Phone Book and an Address Book, a calendar and schedules. It is assumed that the host PC prepares such data to be downloaded. In addition, to implement a seamless data transfer, the host PC converts original data into data having a size and a format that the terminal 100 can handle, and prepares to download the resultant data. For example, the host PC periodically communicates with the Internet and updates the contents of a registered Web page. Further, the host PC removes image data among the Web page because the terminal 100 can not process any image data. Furthermore, the host PC edits PIM data using a PIM application, such as a Lotus organizer, processes the PIM data to data having a size and a format that the terminal 100 can handle, and stores the data (see FIG. 19).

Figure 20:
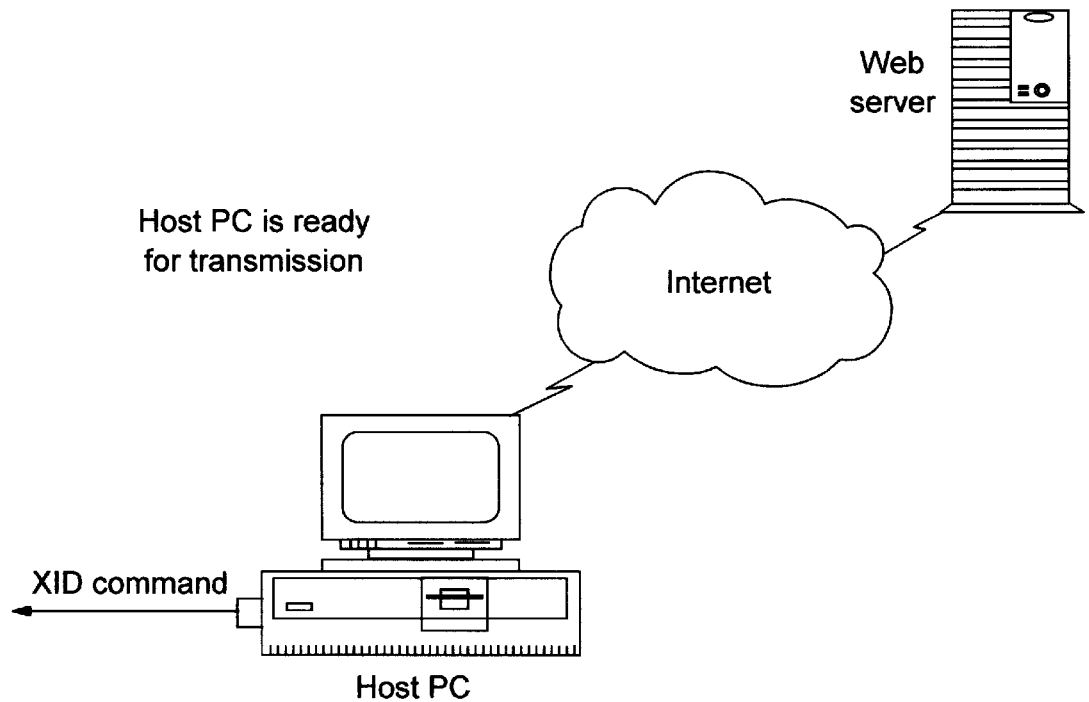
FIG. 20 is a specific diagram showing the IR communication operation between the host PC and the portable information terminal 100, and more specifically, showing the condition where the host PC transmits an XID command to discover a station.

After the download data is stored in the host PC, a user sets the host PC to the IR transmission state. The IR communication protocol is standardized by "IrDA (Infrared Data Association)". The protocol relating to a data link is called "IrLAP". The general communication processing for IrLAP includes "discovery of a station", "connection", "data exchange" and "disconnection". In this embodiment, during transmission, the host PC constantly transmits an XID command ("XID command" is a frame for searching a station) at any time other than during data transmission. This phase continues until the host PC receives a UA response (which will be described later) (see FIG. 20).

Figure 21:
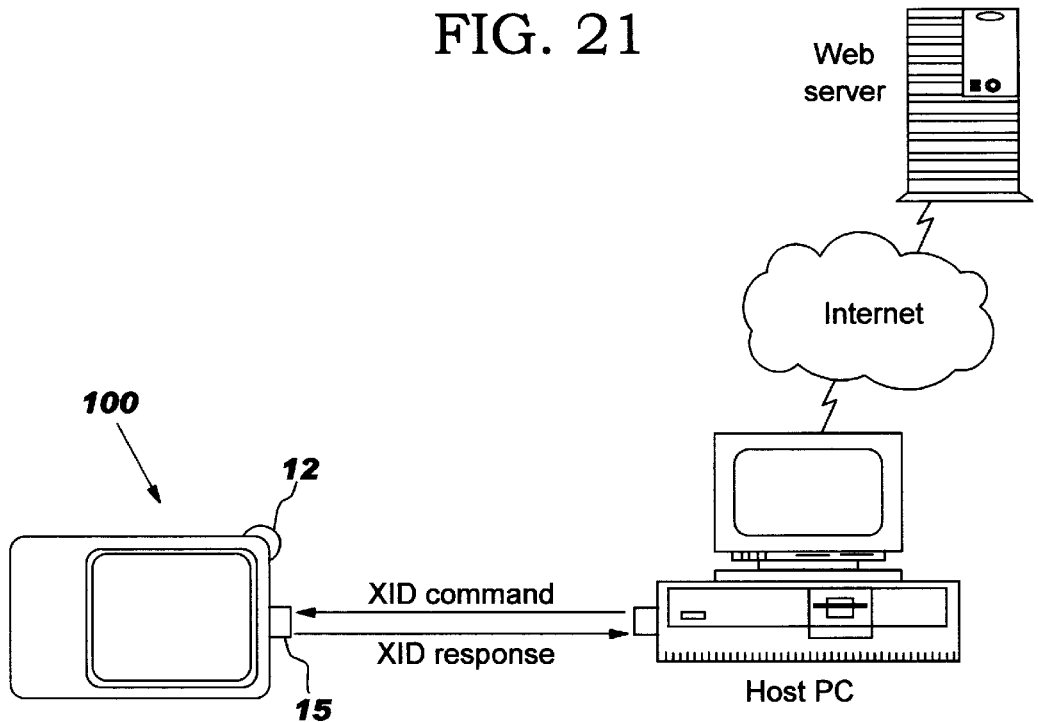
FIG. 21 is a specific diagram showing the IR communication operation between the host PC and the portable information terminal 100, and more specifically, showing the condition where the terminal 100 returns an XID response upon receipt of the XID command from the host PC.

In order to download data to the portable information terminal 100, a user just needs to depress the cancel button 13 momentarily in the initial mode when the main menu is open, so that the terminal 100 is switched to the IR reception mode. Once the IR receiver 15 is set in a reception range for or infrared transmission by the host PC, the terminal 100 positively responds to the XID command by generating a frame for an XID response, and the discovery of a station is established (see FIG. 21). The XID command frame and the response frame include the addresses of their devices, so that the addresses can be confirmed by the respective apparatuses. It is assumed that in the XID command/response routine, the IR communication indicates the entire "Discovery Procedure" described in chapter 6.8 in "Serial Infrared Link Access Protocol (IrLAP) Ver 1.0".

Figure 22:
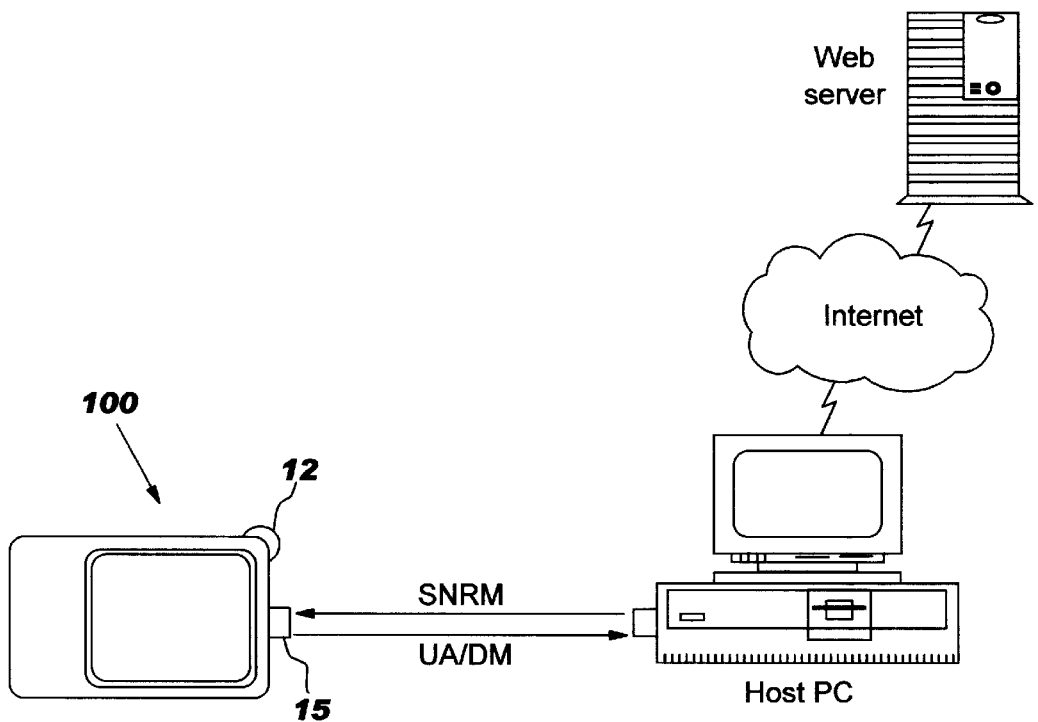
FIG. 22 is a specific diagram showing the IR communication operation between the host PC and the portable information terminal 100, and more specifically, showing the condition where connection setting is performed by both devices.

Following this, the connection between the host PC and the terminal 100 is established. The connection setting is the procedure whereby both apparatuses discuss and determine the communication speed for a frame and a data size. For the connection setting, the host PC transmits an SNRM (Set Normal Response Mode) frame. When it accepts this frame, the terminal 100 returns a UA (Unnumbered Acknowledgement) frame. When the terminal 100 can not accept the SNRM frame, it returns a DM (Disconnected Mode) frame (see FIG. 22).

Figure 23:
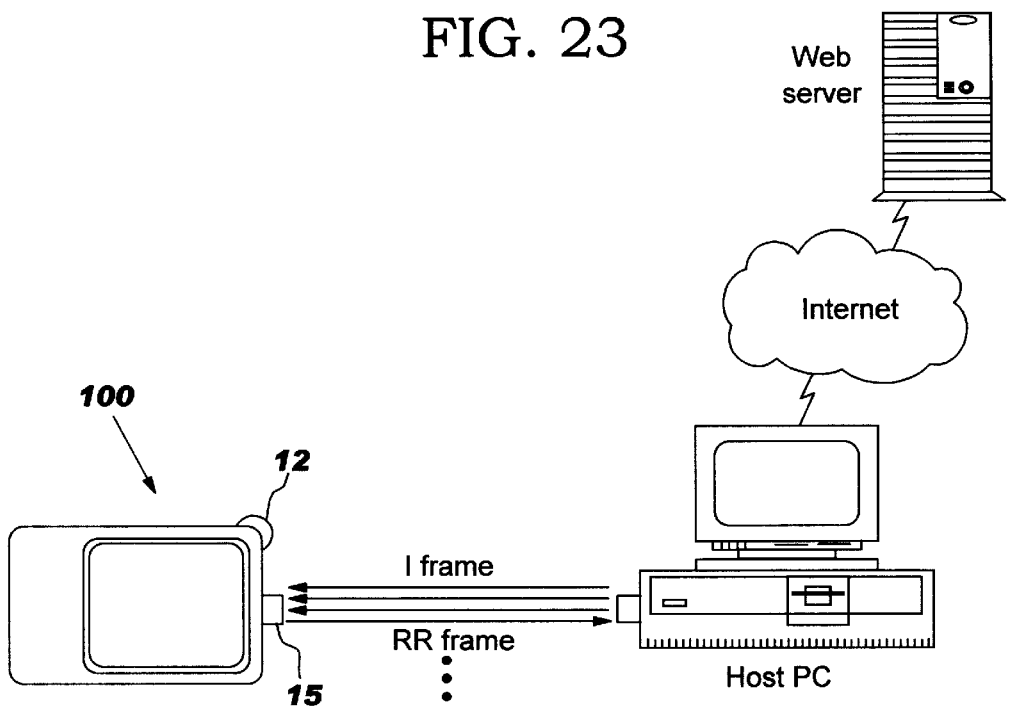
FIG. 23 is a specific diagram showing the IR communication operation between the host PC and the portable information terminal 100, and more specifically, showing the condition where the host PC downloads data to the terminal 100.

When the host PC receive the UA frame and the connection is established, data exchange can be enabled. In this embodiment, data is transferred unidirectionally from the host PC to the terminal 100. The data is transmitted in an I (Information) frame (see FIG. 23).

Figure 24:
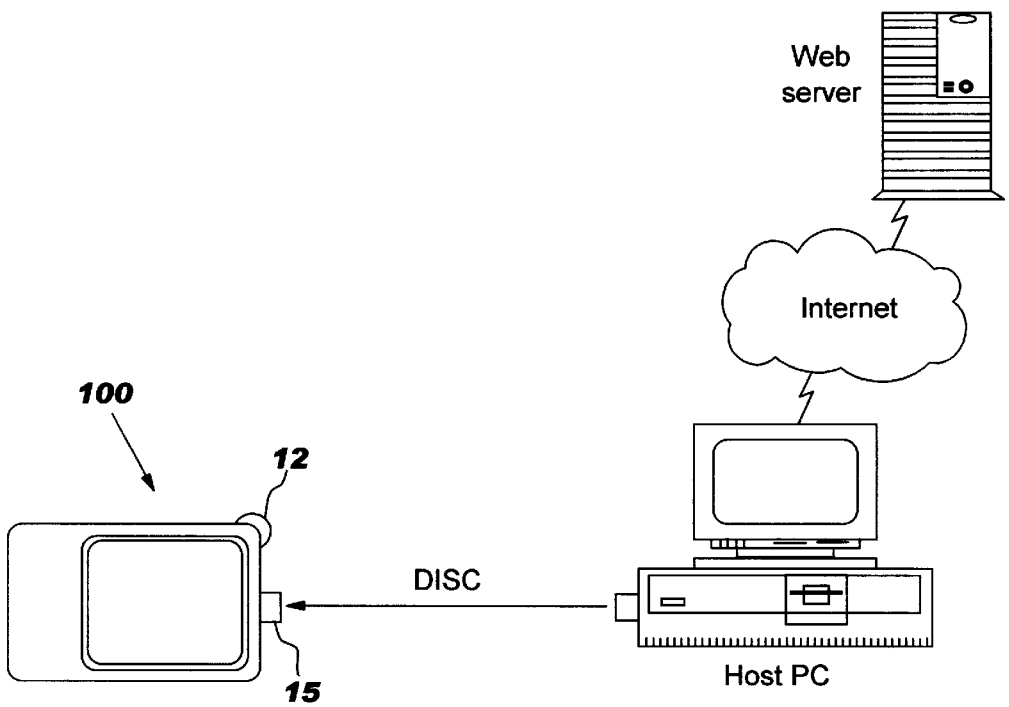
FIG. 24 is a specific diagram showing the IR communication operation between the host PC and the portable information terminal 100, and more specifically, showing the condition where the host PC transmits a DISC command to require disconnection.
Figure 25:
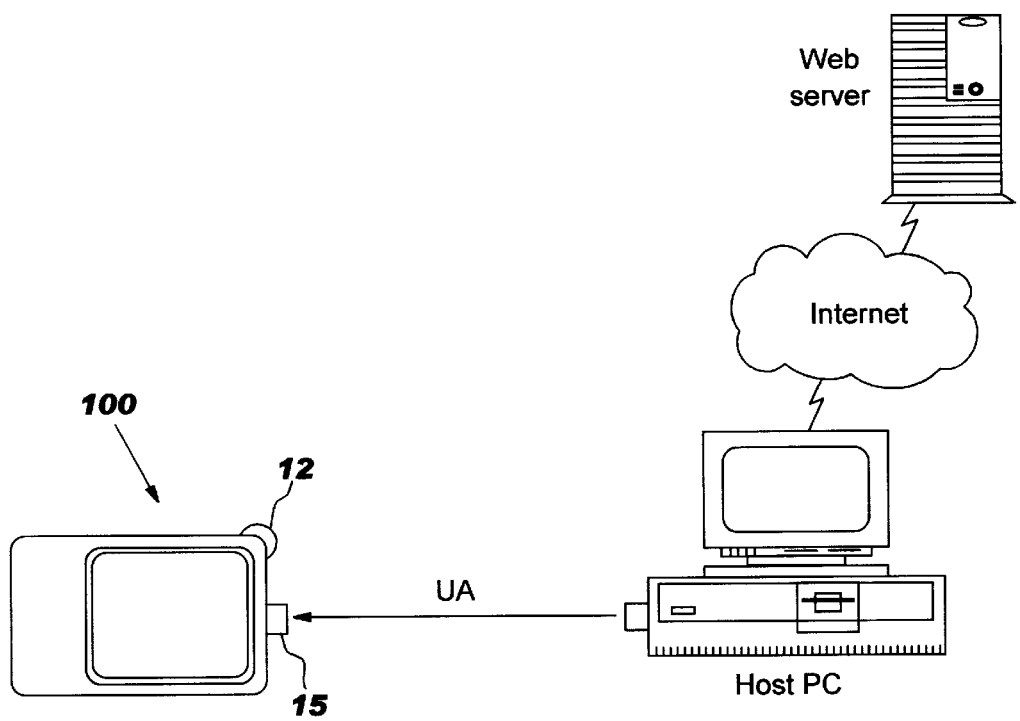
FIG. 25 is a specific diagram showing the IR communication operation between the host PC and the portable information terminal 100, and more specifically, showing the condition where the terminal 100 returns a UA response upon receipt of the DISC command.

When a predetermined data transfer is completed, the line is disconnected. That is, after completing the data downloading operation, the host PC transmits a DISC (Disconnection) frame to require disconnection (see FIG. 24). Upon receipt of the DISC frame, the terminal 100 transmits a UA frame. Thereafter, the disconnection procedure is terminated (see FIG. 25).

When the line is disconnected, both apparatuses initialize the communication states. In this embodiment, the host PC returns to the station discovery mode in FIG. 20 and continuously transmits an XID command for trying to find a station unless it entirely exits the communication state.

It should be fully understood that, in this embodiment, a user for the portable information terminal 100 can seamlessly acquire desired data just by momentarily depressing the cancel button 13 in the main menu mode.

Although, in this embodiment, the host PC constantly outputs an XID command frame to discover a station, the infrared output requires only several percent of the power consumed by a liquid crystal display of about 12 inches.

Therefore, even when the host PC is a battery operated PC, the continuous output of an XID command affects the battery operating period very little.

The present invention has been described in detail while referring to a specific embodiment. However, it should be obvious to one having ordinary skill in the art that various modifications or revisions of the embodiment are possible within the scope of the present invention. For example, the present invention can be applied to portable radio terminals, cordless telephone sets, or small electric/electronic apparatuses, such as electronic notebooks, that have a relatively small display screen.

In the embodiment here described, based on a premise that a right-handed user is using the device for his or her daily work, the portable information terminal 100 is held in the left hand and the rotary switch 12 is arranged at the left upper end of the terminal 100, so that the left thumb contacts the rotary switch 12. However, while taking into consideration the fact that a user may hold the terminal 100 in the right hand, the subject of the present invention also includes a modification whereby the rotary switch 12 is arranged at the right upper end of the main body of the terminal 100.

In the drawings and specifications there has been set forth a preferred embodiment of the invention and, although specific terms are used, the description thus given uses terminology in a generic and descriptive sense only and not for purposes of limitation.

What is claimed is:

1. An information processing apparatus for providing appropriate scroll functionality for both portrait and landscape display modes, said information processor comprising:
   a main body having a front surface, an upper side wall, and left and right side walls and sized to be held in and manipulated by the hand of a user, said left and right side walls intersecting to define a corner;
   a display screen mounted in said main body and viewable on the front surface of said main body;
   a rotary switch directing the scrolling of data on said display screen, said rotary switch being mounted adjacent the upper left corner of said main body between the left side wall and the upper side wall of said main body, so that a manipulation portion of said rotary switch is exposed relative to both said left side and said upper side;
   a display mode switch for selecting a display mode for said display screen between a portrait mode and a landscape mode; and
   a scrolling direction control operatively connected with said rotary switch and said display mode switch wherein said scrolling direction control changes the scrolling direction of data displayed on the display screen in accordance with the selected display mode so that data displayed in either of the portrait and landscape modes is scrolled vertically as the rotary switch is rotated;
   wherein said rotary switch comprises a rotation sensor that effectuates scrolling responsive to rotation of said manipulation portion, and a pressure sensor that effectuates scrolling direction control responsive to pressure applied horizontally or vertically against said manipulation portion.

2. The information processing apparatus according to claim 1, wherein said scrolling direction control is selectively operable to change the scrolling direction of data displayed in either of the portrait and landscape modes to horizontal as the rotary switch is rotated.

3. The information processing apparatus according to claim 1, wherein said scrolling direction control controls the scrolling direction of data displayed on the display screen in accordance with the selected current display mode such that, when data on said display screen is displayed in portrait mode, clockwise rotation of said rotary switch effectuates scrolling up said display screen, and counterclockwise rotation of said rotary switch effectuates scrolling down said display screen, and such that, when data on said display screen is displayed in landscape mode, clockwise rotation of said rotary switch effectuates scrolling up said display screen, and counterclockwise rotation of said rotary switch effectuates scrolling down said display screen.

4. The information processing apparatus according to claim 1, wherein
   said scrolling direction control controls the scrolling direction of data displayed on the display screen in accordance with the selected current display mode such that, when data on said display screen is displayed in portrait mode, clockwise rotation of said rotary switch effectuates scrolling down said display screen and counterclockwise rotation of said rotary switch effectuates scrolling up said display screen, and such that, when data on said display screen is displayed in landscape mode, clockwise rotation of said rotary switch effectuates scrolling down said display screen and counterclockwise rotation of said rotary switch effectuates scrolling up said display screen.

5. The information processing apparatus according to claim 1 further comprising: an infrared communication port for exchanging data with external device.

6. An information processing apparatus for providing appropriate scroll functionality for both portrait and landscape display modes, said information processor comprising:
   a main body having a front surface, an upper side wall, and left and right side walls and sized to be held in and manipulated by the hand of a user, said left and right side walls intersecting to define a corner;
   a display screen mounted in said main body and viewable on the front surface of said main body;
   a rotary switch directing the scrolling of data on said display screen, said rotary switch being mounted adjacent the upper left corner of said main body between the left side wall and the upper side wall of said main body, so that a manipulation portion of said rotary switch is exposed relative to both said left side and said upper side;
   a display mode switch for selecting a display mode for said display screen between a portrait mode and a landscape mode; and
   a scrolling direction control operatively connected with said rotary switch and said display mode switch wherein said scrolling direction control changes the scrolling direction of data displayed on the display screen in accordance with the selected display mode so that data displayed in either of the portrait and landscape modes is scrolled vertically as the rotary switch is rotated,
   a rotation sensor coupled to said rotatable member and responsive to rotation of said manipulation portion and detecting a rotation angle for said rotary switch when said rotary switch is being manipulated; and
   a pressure sensor coupled to said rotary switch and responsive to pressure applied against said manipulation portion.

7. The information processing apparatus according to claim 6 further comprising an infrared communication port for exchanging data with an external device.

8. An information processing apparatus according to claim 6, wherein said display controller is operatively connected with said rotation sensor and said pressure sensor and generating a display of a cursor image, and wherein said rotation sensor and said display controller cooperate in interpreting a detected rotation angle as an instruction for displacement of said cursor image across the area of said display, and wherein said pressure sensor and said display controlling cooperate in interpreting application of pressure in the absence of detected rotation as an instruction to selects a vertical or horizontal scrolling control, and wherein said rotation sensor, together with said pressure sensor and said display controller, cooperate in interpreting application of pressure in the presence of detected rotation as a drag instruction to move a windowed portion of a display across the area of said display.

\* \* \* \* \*